US011051205B2

(12) United States Patent
Liu et al.

(10) Patent No.: US 11,051,205 B2
(45) Date of Patent: Jun. 29, 2021

(54) TERMINAL APPARATUS, BASE STATION APPARATUS, AND COMMUNICATION METHOD

(71) Applicants: Sharp Kabushiki Kaisha, Sakai (JP); FG Innovation Company Limited, New Territories (HK)

(72) Inventors: Liqing Liu, Sakai (JP); Shouichi Suzuki, Sakai (JP); Wataru Ohuchi, Sakai (JP); Tomoki Yoshimura, Sakai (JP)

(73) Assignees: SHARP KABUSHIKI KAISHA, Sakai (JP); FG INNOVATION COMPANY LIMITED, New Territories (HK)

( * ) Notice: Subject to any disclaimer, the term of this patent is extended or adjusted under 35 U.S.C. 154(b) by 41 days.

(21) Appl. No.: 16/613,181

(22) PCT Filed: May 22, 2018

(86) PCT No.: PCT/JP2018/019718
§ 371 (c)(1),
(2) Date: Nov. 13, 2019

(87) PCT Pub. No.: WO2018/216701
PCT Pub. Date: Nov. 29, 2018

(65) Prior Publication Data
US 2020/0178116 A1    Jun. 4, 2020

(30) Foreign Application Priority Data

May 26, 2017    (JP) .............................. JP2017-104369

(51) Int. Cl.
*H04W 28/04*    (2009.01)
*H04L 1/18*    (2006.01)
(Continued)

(52) U.S. Cl.
CPC ........... *H04W 28/04* (2013.01); *H04L 1/1812* (2013.01); *H04L 5/001* (2013.01);
(Continued)

(58) Field of Classification Search
CPC ..... H04L 5/001; H04L 5/0053; H04L 1/1812; H04W 72/1268; H04W 72/14; H04W 28/04; H04W 74/006
See application file for complete search history.

(56) References Cited

U.S. PATENT DOCUMENTS

2017/0332397 A1*  11/2017  Li ...................... H04L 1/1887
2018/0019844 A1*  1/2018  Nogami ................ H04L 5/0055
(Continued)

OTHER PUBLICATIONS

Ericsson, Huawei; "New SI proposal: Study on Latency reduction techniques for LTE"; 3GPP TSG RAN Meeting #67 Shanghai, China, Mar. 9-12, 2015; RP-150465 (Year: 2015).*
Ericsson; "New Work Item on shortened TTI and processing time for LTE"; 3GPP TSG RAN Meeting #72 Busan, Korea, Jun. 13-16, 2016; RP-161299 (Year: 2016).*
Official Communication issued in International Patent Application No. PCT/JP2018/019718, dated Jun. 26, 2018.
(Continued)

*Primary Examiner* — Gary Mui
(74) *Attorney, Agent, or Firm* — Keating & Bennett, LLP

(57) ABSTRACT

A base station apparatus (3) includes a receiver (30) configured to receive an initial transmission of a transport block and a transmitter (30) configured to transmit a PDCCH for retransmission of the transport block. An uplink grant for the initial transmission of the transport block is included in a random access response corresponding to a non-contention based random access procedure. A type of a search space in which the PDCCH for retransmission of the transport block is transmitted is determined, based at least on whether an RRC layer parameter shortProcessingTime is configured for the terminal apparatus.

4 Claims, 8 Drawing Sheets

(51) Int. Cl.
*H04L 5/00* (2006.01)
*H04W 72/12* (2009.01)
*H04W 72/14* (2009.01)
*H04W 74/00* (2009.01)

(52) U.S. Cl.
CPC ....... *H04W 72/1268* (2013.01); *H04W 72/14* (2013.01); *H04W 74/006* (2013.01)

(56) References Cited

U.S. PATENT DOCUMENTS

| | | | |
|---|---|---|---|
| 2018/0020335 A1* | 1/2018 | Yin | H04L 1/1854 |
| 2018/0242354 A1* | 8/2018 | Takeda | H04W 74/04 |
| 2019/0116611 A1* | 4/2019 | Lee | H04W 72/1278 |
| 2019/0182012 A1* | 6/2019 | Liu | H04W 72/0446 |
| 2019/0191434 A1* | 6/2019 | Hugl | H04L 5/0096 |
| 2019/0215906 A1* | 7/2019 | Phuyal | H04L 1/1854 |
| 2019/0230498 A1* | 7/2019 | Lee | H04L 5/0082 |
| 2020/0037280 A1* | 1/2020 | Enbuske | H04W 56/0055 |
| 2020/0052830 A1* | 2/2020 | Liu | H04L 5/14 |
| 2020/0136782 A1* | 4/2020 | Liu | H04W 72/12 |
| 2020/0154411 A1* | 5/2020 | Liu | H04L 1/1864 |

OTHER PUBLICATIONS

Huawei et al., "Asynchronous UL HARQ", 3GPP TSG RAN WG1 Meeting #89, R1-1706982, May 15-19, 2017, 4 pages.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 12)", 3GPP TS 36.300 V124.0, Dec. 2014, pp. 1-251.
Ericsson, "New Work Item on shortened TTI and processing time for LTE", 3GPP TSG RAN Meeting #72, RP-161299, Jun. 13-16, 2016, 8 pages.
Qualcomm Incorporated, "HARQ and search space management", 3GPP TSG RAN WG1 Meeting #88, R1-1702573, Feb. 13-17, 2017, 4 pages.
Interdigital Communications, "Support for Short TTIs in UL", 3GPP TSG-RAN WG1 #84, R1-161092, Feb. 15-19, 2016, 4 pages.
Ericsson, "HARQ processes with fallback, asynchronous to synchronous HARQ", 3GPP TSG-RAN WG2 #98, TDOC R2-1704723, May 15-19, 2017, 5 pages.

* cited by examiner

| UL-DL CONFIGURATION | DOWNLINK-TO-UPLINK SWITCH-POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5ms | D | S | U | U | U | D | S | U | U | U |
| 1 | 5ms | D | S | U | U | D | D | S | U | U | D |
| 2 | 5ms | D | S | U | D | D | D | S | U | D | D |
| 3 | 10ms | D | S | U | U | U | D | D | D | D | D |
| 4 | 10ms | D | S | U | U | D | D | D | D | D | D |
| 5 | 10ms | D | S | U | D | D | D | D | D | D | D |
| 6 | 5ms | D | S | U | U | U | D | S | U | U | D |

1> (condition A) If the initial PUSCH transmission for a transport block was scheduled by the uplink grant included in the random access response corresponding to the contention based random access procedure, 2> (Process A) the UE may assume that PDCCH for a PUSCH retransmission of the same transport block will occur in the common search space.

1> (condition B) Else if a UE is not configured with a higher layer parameter *PUSCHEnh-Configuration,*

2> (condition C) if the PDCCH for the corresponding initial PUSCH transmission for a transport block was decoded, or 2> (condition D) if the initial PUSCH transmission for a transport block was scheduled by the uplink grant included in the random access response corresponding to the non-contention based random access procedure, 3> (Process B) the UE may assume that PDCCH for a PUSCH retransmission of the same transport block will occur in the common search space or the UE specific search space.

1> (condition E) Else if a UE is configured with a higher layer parameter *PUSCHEnh-Configuration,*

2> (condition F) if the PDCCH for the corresponding initial PUSCH transmission for a transport block was decoded in the UE specific search space, or 2> (condition G) if the initial PUSCH transmission for a transport block was scheduled by the uplink grant included in the random access response corresponding to the non-contention based random access procedure, 3> (Process C) the UE may assume that PDCCH for a PUSCH retransmission of the same transport block will occur in the UE specific search space.

2> (condition H) if the PDCCH for the corresponding initial PUSCH transmission for a transport block was decoded in the common search space, 2> (Process A) the UE may assume that PDCCH for a PUSCH retransmission of the same transport block will occur in the common search space.

<FROM FIG. 7>

1> (condition I) Else if a UE is not configured with a higher layer parameter *shortProcessingTime*, 2> (condition C) if the PDCCH for the corresponding initial PUSCH transmission for a transport block was decoded, or 2> (condition D) if the initial PUSCH transmission for a transport block was scheduled by the uplink grant included in the random access response corresponding to the non-contention based random access procedure, 3> (Process B) the UE may assume that PDCCH for a PUSCH retransmission of the same transport block will occur in the common search space or the UE specific search space.

1> (condition J) Else if a UE is configured with a higher layer parameter *shortProcessingTime*, 2> (condition F) if the PDCCH for the corresponding initial PUSCH transmission for a transport block was decoded in the UE specific search space, 3> (Process C) the UE may assume that PDCCH for a PUSCH retransmission of the same transport block will occur in the UE specific search space.

2> (condition H) if the PDCCH for the corresponding initial PUSCH transmission for a transport block was decoded in the common search space, or 2> (condition G) if the initial PUSCH transmission for a transport block was scheduled by the uplink grant included in the random access response corresponding to the non-contention based random access procedure, 3> (Process A) the UE may assume that PDCCH for a PUSCH retransmission of the same transport block will occur in the common search space.

FIG. 8

TERMINAL APPARATUS, BASE STATION APPARATUS, AND COMMUNICATION METHOD

TECHNICAL FIELD

An aspect of the present invention relates to a terminal apparatus, a base station apparatus, and a communication method.

BACKGROUND ART

The 3rd Generation Partnership Project (3GPP) has been studying a radio access method and a radio network for cellular mobile communications (referred to as "Long Term Evolution (LTE)", "Evolved Universal Terrestrial Radio Access (EUTRA)", "Evolved Universal Terrestrial Radio Access Network (EUTRAN)", and "New Radio"). A base station apparatus is also referred to as an evolved NodeB (eNodeB) or a gNodeB. A terminal apparatus is also referred to as a User Equipment (UE). It is a cellular communication system, in which multiple areas are deployed in a cellular structure, with each of the multiple areas being covered by a base station apparatus. A single base station apparatus may manage multiple cells. In 3GPP, latency reduction enhancements have been studied. For example, for a solution for latency reduction, an effort has been started to reduce processing time with respect to a legacy (1 ms) Transmission Time Interval (TTI) (NPL 1).

Hybrid Automatic Repeat reQuest (HARQ) functionality is provided in a Medium Access Control (MAC) layer. The HARQ functionality in a downlink is characterized by an asynchronous adaptive HARQ, and the HARQ functionality in an uplink is characterized by a synchronous HARQ (NPL 2). The 3GPP has been discussing introduction of the asynchronous HARQ in the uplink (NPL 3). However, a search space is not sufficiently studied in which an uplink HARQ and an uplink grant are transmitted, based on whether a reduction in processing time is configured.

CITATION LIST

Non Patent Literature

NPL 1: "Work Item on shortened TTI and processing time for LTE", RP—161299, Ericsson, 3GPP TSG RAN Meeting #72, Busan, Korea, Jun. 13 to 16, 2016.

NPL 2: "3GPP TS 36.300 v12.4.0 Evolved Universal Terrestrial Radio Access (E-UTRA) and Evolved Universal Terrestrial Radio Access Network (E-UTRAN); Overall description; Stage 2", 7th November 2015.

NPL 3: "Asynchronous UL HARQ", R1-1706982, Huawei, 3GPP TSG RAN WG1Meeting #89, 15-19 May 2017.

SUMMARY OF INVENTION

Technical Problem

An object of the present invention is to provide a terminal apparatus capable of efficiently communicating with a base station apparatus, an integrated circuit mounted in the terminal apparatus, a communication method used for the terminal apparatus, a base station apparatus for communicating with terminal apparatus, a communication method used for the base station apparatus, and an integrated circuit mounted in the base station apparatus.

Solution to Problem (1) To accomplish the object described above, aspects of the present invention are contrived to provide the following measures. Specifically, a first aspect of the present invention is a terminal apparatus including a transmitter configured to perform an initial transmission of a transport block; and a receiver configured to attempt to decode a PDCCH for retransmission of the transport block, wherein an uplink grant for the initial transmission of the transport block is included in a random access response corresponding to a non-contention based random access procedure, and a type of a search space in which decoding of the PDCCH for retransmission of the transport block is attempted is determined, based at least on whether an RRC layer parameter shortProcessingTime is configured.

(2) A second aspect of the present invention is a base station apparatus for communicating with a terminal apparatus, the base station apparatus including a receiver configured to receive an initial transmission of a transport block, and a transmitter configured to transmit a PDCCH for retransmission of the transport block, wherein an uplink grant for the initial transmission of the transport block is included in a random access response corresponding to a non-contention based random access procedure, and a type of a search space in which the PDCCH for retransmission of the transport block is transmitted is determined, based at least on whether the RRC layer parameter shortProcessingTime is configured for the terminal apparatus.

(3) A third aspect of the present invention is a communication method used for a terminal apparatus, the communication method including the steps of performing an initial transmission of a transport block, and attempting to decode a PDCCH for retransmission of the transport block, wherein an uplink grant for the initial transmission of the transport block is included in a random access response corresponding to a non-contention based random access procedure, and a type of a search space in which decoding of the PDCCH for retransmission of the transport block is attempted is determined, based at least on whether or not an RRC layer parameter shortProcessingTime is configured.

(4) A fourth aspect of the present invention is a communication method used for a base station apparatus configured to communicate with a terminal apparatus, the communication method including the steps of receiving an initial transmission of a transport block, and transmitting a PDCCH for retransmission of the transport block, wherein an uplink grant for the initial transmission of the transport block is included in a random access response corresponding to a non-contention based random access procedure, and a type of a search space in which the PDCCH for retransmission of the transport block is transmitted is determined, based at least on whether an RRC layer parameter shortProcessingTime is configured for the terminal apparatus.

Advantageous Effects of Invention

According to the present invention, a terminal apparatus can efficiently communicate with a base station apparatus.

BRIEF DESCRIPTION OF DRAWINGS

FIG. 7 is a diagram illustrating pseudo codes related to decoding of a PDCCH for retransmission of the HARQ.

FIG. 8 is a diagram illustrating the pseudo codes related to decoding of the PDCCH for retransmission of the HARQ.

DESCRIPTION OF EMBODIMENTS

Embodiments of the present invention will be described below.

Figure 1:
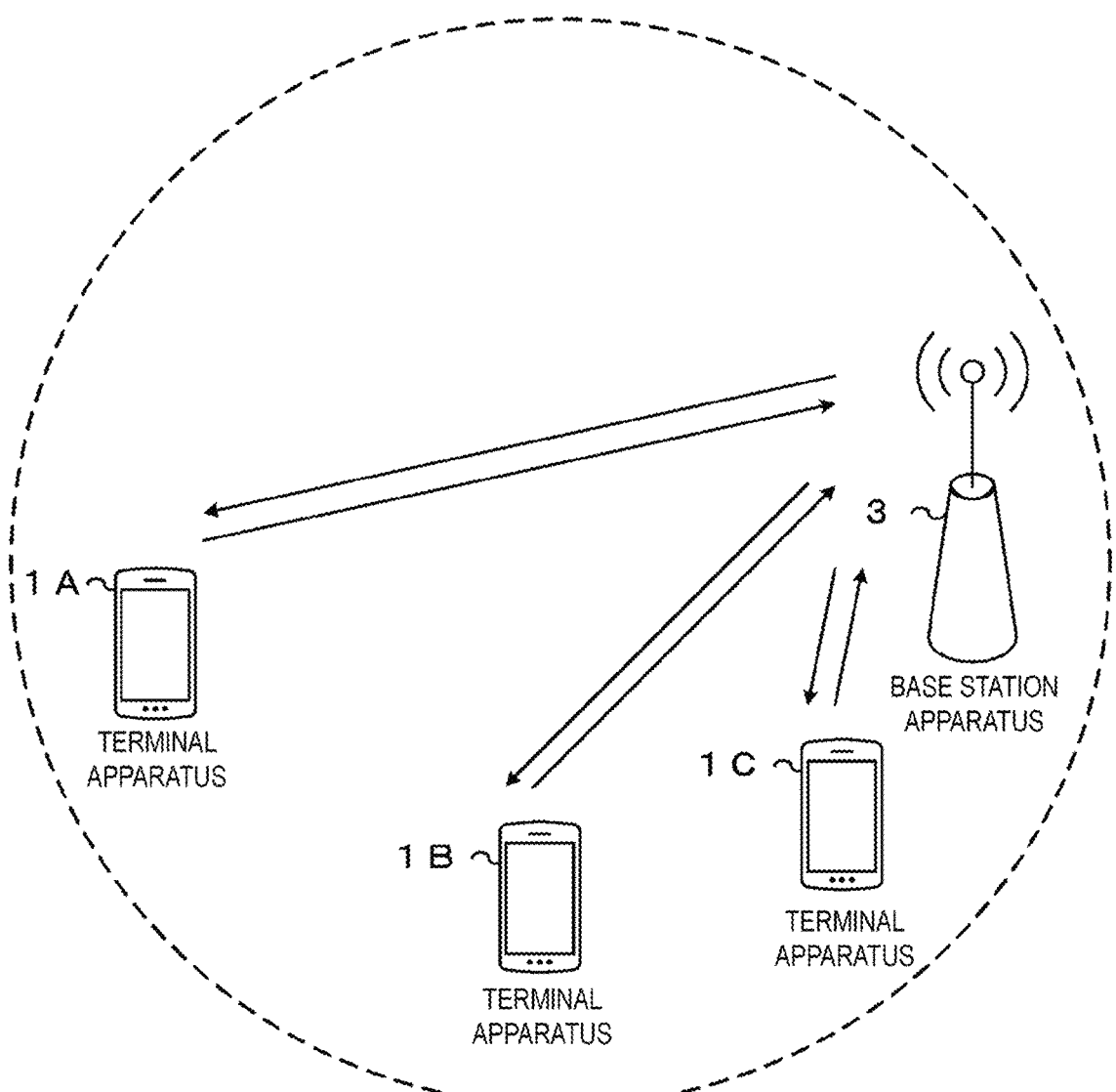
FIG. 1 is a conceptual diagram of a radio communication system according to the present embodiment.

FIG. 1 is a conceptual diagram of a radio communication system according to the present embodiment. In FIG. 1, a radio communication system includes terminal apparatuses 1A to 1C and a base station apparatus 3. The terminal apparatuses 1A to 1C are each referred to as a terminal apparatus 1.

Hereinafter, carrier aggregation will be described.

According to the present embodiment, at least one of multiple serving cells are configured for the terminal apparatus 1. A technology in which the terminal apparatus 1 communicates via the multiple serving cells is referred to as cell aggregation or carrier aggregation. The present invention may be applied to each of the multiple serving cells configured for the terminal apparatus 1. The present invention may be applied to some of the multiple serving cells configured. The present invention may be applied to each of multiple serving cell groups configured. The present invention may be applied to some of the multiple serving cell groups configured. In carrier aggregation, multiple serving cells configured are also referred to as aggregated serving cells. Hereinafter, unless otherwise specified, the present embodiment is applied to a primary cell or one serving cell.

Time Division Duplex (TDD) and/or Frequency Division Duplex (FDD) is applied to a radio communication system in the present embodiment. For cell aggregation, FDD may be applied to all the multiple serving cells. For cell aggregation, TDD may be applied to all multiple serving cells. For cell aggregation, serving cells to which TDD is applied and serving cells to which FDD is applied may be aggregated.

The one or more serving cells configured include one primary cell and zero or more secondary cells. The primary cell is a cell in which an initial connection establishment procedure has been performed, a cell in which a connection re-establishment procedure has initiated, or a cell indicated as a primary cell in a handover procedure. The secondary cell may be configured/added at a point of time when or after a Radio Resource Control (RRC) connection is established.

A carrier corresponding to a serving cell in the downlink is referred to as a downlink component carrier. A carrier corresponding to a serving cell in the uplink is referred to as an uplink component carrier. The downlink component carrier and the uplink component carrier are collectively referred to as a component carrier. In FDD, the uplink component carrier and the downlink component carrier correspond to different carrier frequencies. In TDD, the uplink component carrier and the downlink component carrier correspond to the same carrier frequencies.

The terminal apparatus 1 can perform simultaneous transmission and/or reception on multiple physical channels in multiple serving cells (component carriers). A single physical channel is transmitted in a single serving cell (component carrier) out of the multiple serving cells (component carriers).

Figure 2:
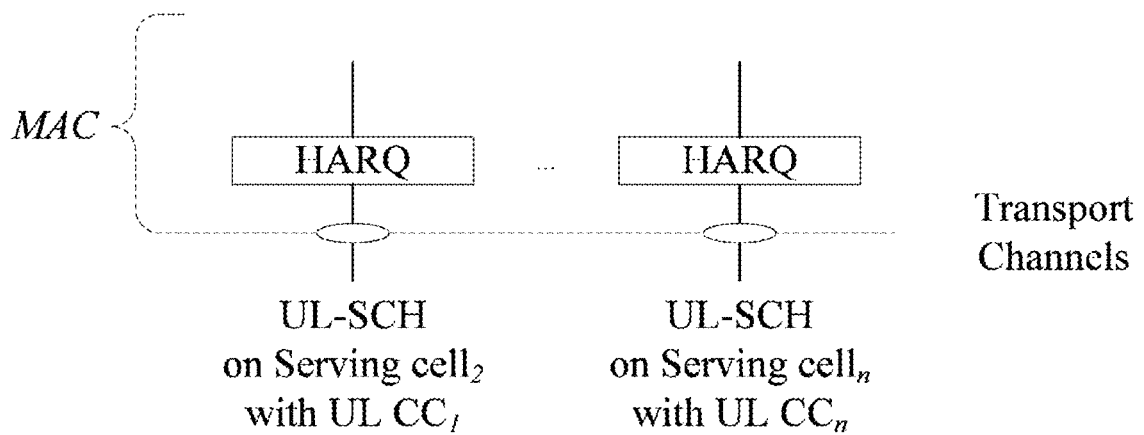
FIG. 2 is a diagram illustrating an example of a structure of a MAC layer for an uplink configured with carrier aggregation according to the present embodiment.

FIG. 2 is a diagram illustrating an example of a structure of a MAC layer for an uplink configured with carrier aggregation according to the present embodiment. In the uplink configured with carrier aggregation, one independent HARQ entity exists for each serving cell (uplink component carrier). The HARQ entity manages multiple HARQ processes in parallel. The HARQ process is associated with an HARQ buffer. That is, the HARQ entity is associated with multiple HARQ buffers. The HARQ process stores MAC layer data in the HARQ buffer. The HARQ process indicates to a physical layer to transmit the MAC layer data.

In the uplink configured with carrier aggregation, at least one transport block may be generated for each of Transmission Time Intervals (TTIs) for each serving cell. Each of the transport blocks and HARQ retransmission of the transport block are mapped to one serving cell. The TTI is also referred to as a subframe. The transport block is MAC layer data transmitted on an uplink shared channel (UL-SCH).

In the uplink according to the present embodiment, the "transport block", a "MAC Protocol Data Unit (PDU)", "MAC layer data", the "UL-SCH", "UL-SCH data", and "uplink data" are assumed to be the same.

Physical channels and physical signals according to the present embodiment will be described.

In uplink radio communication from the terminal apparatus 1 to the base station apparatus 3, the following uplink physical channels are used. The uplink physical channels are used for transmitting information output from a higher layer.

Physical Uplink Control Channel (PUCCH)

Physical Uplink Shared Channel (PUSCH)

Physical Random Access Channel (PRACH)

The PUCCH is used to transmit Uplink Control Information (UCI). The uplink control information includes: downlink Channel State Information (CSI); a Scheduling Request (SR) used to request for a PUSCH (Uplink-Shared Channel: UL-SCH) resource for initial transmission; and a Hybrid Automatic Repeat request ACKnowledgement (HARQ-ACK) for downlink data (a Transport block, a Medium Access Control Protocol Data Unit (MAC PDU), a Downlink-Shared Channel (DL-SCH), or a Physical Downlink Shared Channel (PDSCH)). The HARQ-ACK indicates an acknowledgement (ACK) or a negative-acknowledgement (NACK). The HARQ-ACK is also referred to as ACK/NACK, HARQ feedback, HARQ acknowledge, or HARQ control information.

The scheduling request includes a positive scheduling request or a negative scheduling request. The positive scheduling request indicates to request a UL-SCH resource for initial transmission. The negative scheduling request indicates not to request the UL-SCH resource for the initial transmission.

The PUSCH is used for transmission of uplink data (Uplink-Shared Channel (UL-SCH)). The PUSCH may be used to transmit the HARQ-ACK and/or channel state information along with the uplink data. The PUSCH may be used to transmit only the channel state information. The PUSCH may be used to transmit only the HARQ-ACK and the channel state information.

Here, the base station apparatus 3 and the terminal apparatus 1 exchange (transmit and/or receive) signals with each other in their respective higher layers. For example, the base station apparatus 3 and the terminal apparatus 1 may transmit and/or receive RRC signaling in a Radio Resource Control (RRC) layer. The base station apparatus 3 and the terminal apparatus 1 may transmit and/or receive, in a Medium Access Control (MAC) layer, a MAC CE. Here, the RRC signaling and/or the MAC CE is also referred to as higher layer signaling. The RRC signaling and/or the MAC CE are/is included in a transport block.

In the present embodiment, "RRC signaling", "RRC layer information", "RRC layer signal" "RRC layer parameter", "RRC message", and "RRC information element" are assumed to mean the same thing.

The PUSCH is used to transmit the RRC signaling and the MAC CE. Here, the RRC signaling transmitted from the base station apparatus 3 may be signaling common to multiple terminal apparatuses 1 in a cell. The RRC signaling transmitted from the base station apparatus 3 may be signaling dedicated to a certain terminal apparatus 1 (also referred to as dedicated signaling). In other words, user device-specific (user device-unique) information is transmitted using the signaling dedicated to a certain terminal apparatus 1.

PRACH is used to transmit a random access preamble. The PRACH is used for indicating the initial connection establishment procedure, the handover procedure, the connection re-establishment procedure, synchronization (timing adjustment) for uplink transmission, and the request for the PUSCH (UL-SCH) resource.

The following uplink physical signal is used for uplink radio communication. The uplink physical signal is not used to transmit information output from the higher layer, but is used by a physical layer.

Uplink Reference Signal (UL RS)

The following downlink physical channels are used for downlink radio communication from the base station apparatus 3 to the terminal apparatus 1. The downlink physical channels are used for transmitting information output from the higher layer.

Physical Broadcast Channel (PBCH)
Physical Control Format Indicator Channel (PCFICH)
Physical Hybrid automatic repeat request Indicator Channel (PHICH)
Physical Downlink Control Channel (PDCCH)
Enhanced Physical Downlink Control Channel (EPDCCH)
Physical Downlink Shared Channel (PDSCH)
Physical Multicast Channel (PMCH)

The PBCH is used for broadcasting a Master Information Block (MIB, a Broadcast Channel (BCH)) that is shared by the terminal apparatuses 1.

The PCFICH is used for transmission of information indicating a region (OFDM symbols) to be used for transmission of the PDCCH.

The PHICH is used for transmission of an HARQ indicator (HARQ feedback or response information) indicating an ACKnowledgement (ACK) or a Negative ACKnowledgement (NACK) for the uplink data (Uplink Shared Channel (UL-SCH)) received by the base station apparatus 3.

The PDCCH and the EPDCCH are used to transmit Downlink Control Information (DCI). In the present embodiment, the "PDCCH" is assumed to include the "EPDCCH" for the sake of convenience. The downlink control information is also referred to as DCI format. The downlink control information transmitted on one PDCCH includes a downlink grant and HARQ information, or an uplink grant and HARQ information. The downlink grant is also referred to as a downlink assignment or a downlink allocation. The downlink assignment and the uplink grant are not transmitted together on one PDCCH. The downlink grant and the uplink grant may include HARQ information.

The downlink assignment is used for scheduling a single PDSCH within a single cell. The downlink assignment is used for scheduling the PDSCH within the same subframe as the subframe in which the downlink grant has been transmitted.

The uplink grant may be used for scheduling a single PUSCH within a single cell. The uplink grant may be used for scheduling a single PUSCH within a sequence of subframes succeeding the subframe in which the uplink grant has been transmitted.

The HARQ information may include a New Data Indicator (NDI) and information indicating a transport block size. The HARQ information transmitted on the PDCCH along with the downlink assignment also includes information indicating the number of the HARQ process in the downlink (downlink HARQ process Identifier/Identity, downlink HARQ process number). The HARQ information transmitted on the PDCCH with the uplink grant for the asynchronous HARQ may include information indicating the number of the HARQ process in the uplink (uplink HARQ process Identifier/Identity, uplink HARQ process number). The HARQ information transmitted on the PDCCH with the uplink grant for the synchronous HARQ need not include information indicating the number of the HARQ process in the uplink (uplink HARQ process Identifier/Identity, uplink HARQ process number).

The NDI indicates an initial transmission or retransmission. An HARQ entity indicates to a certain HARQ process to trigger the initial transmission in a case that the NDI provided by the HARQ information has been toggled relative to the value of the NDI for the transmission preceding the certain HARQ process. The HARQ entity indicates to a certain HARQ process to trigger the retransmission in a case that the NDI provided by the HARQ information has not been toggled as compared to the value of the NDI for the transmission preceding the certain HARQ process. Note that the HARQ process may determine whether NDI has been toggled.

The HARQ entity identifies the HARQ process to which the uplink grant and the HARQ information correspond, and passes the uplink grant and the HARQ information to the identified HARQ process. The HARQ process stores the uplink grant and the HARQ information passed from the HARQ entity.

Cyclic Redundancy Check (CRC) parity bits added to the downlink control information transmitted on one PDCCH are scrambled with a Cell-Radio Network Temporary Identifier (C-RNTI), a Semi Persistent Scheduling (SPS) C-RNTI, or a Temporary C-RNTI. The C-RNTI and the SPS C-RNTI are identifiers for identifying a terminal apparatus within a cell. The Temporary C-RNTI serves as an identifier for identifying the terminal apparatus 1 that has transmitted a random access preamble in a contention based random access procedure.

The C-RNTI and the Temporary C-RNTI are used to control PDSCH transmission or PUSCH transmission in a single subframe. The SPS C-RNTI is used to periodically allocate a resource for the PDSCH or the PUSCH.

Hereinafter, unless otherwise specified, the CRC parity bits added to the downlink control information according to the present embodiment are scrambled with the C-RNTI.

The PDSCH is used to transmit downlink data (Downlink Shared Channel (DL-SCH)).

The PMCH is used to transmit multicast data (Multicast Channel (MCH)).

The following downlink physical signals are used in the downlink radio communication. The downlink physical signals are not used to transmit the information output from the higher layer, but are used by the physical layer.

Synchronization signal (SS)
Downlink Reference Signal (DL RS)

The synchronization signal is used for the terminal apparatus 1 to establish synchronization in a frequency domain and a time domain in the downlink. In the TDD scheme, the synchronization signal is mapped to subframes 0, 1, 5, and 6 within a radio frame. In the FDD scheme, the synchronization signal is mapped to subframes 0 and 5 within a radio frame.

The downlink reference signal is used for the terminal apparatus 1 to perform channel compensation on a downlink physical channel. The downlink reference signal is used for the terminal apparatus 1 to obtain the downlink channel state information.

According to the present embodiment, the following five types of downlink reference signals are used.

Cell-specific Reference Signal (CRS)
UE-specific Reference Signal (URS) associated with the PDSCH
Demodulation Reference Signal (DMRS) associated with the EPDCCH
Non-Zero Power Chanel State Information-Reference Signal (NZP CSI-RS)
Zero Power Chanel State Information-Reference Signal (ZP CSI-RS)
Multimedia Broadcast and Multicast Service over Single Frequency Network Reference signal (MBSFN RS)
Positioning Reference Signal (PRS)

The downlink physical channels and the downlink physical signals are collectively referred to as a downlink signal. The uplink physical channels and the uplink physical signals are collectively referred to as an uplink signal. The downlink physical channels and the uplink physical channels are collectively referred to as a physical channel. The downlink physical signals and the uplink physical signals are collectively referred to as physical signals.

The BCH, the MCH, the UL-SCH, and the DL-SCH are transport channels. A channel used in the Medium Access Control (MAC) layer is referred to as a transport channel. A unit of the transport channel used in the MAC layer is also referred to as a transport block (TB) or a MAC Protocol Data Unit (PDU). A Hybrid Automatic Repeat reQuest (HARQ) is controlled for each transport block in the MAC layer. The transport block is a unit of data that the MAC layer delivers to the physical layer. In the physical layer, the transport block is mapped to a codeword, and coding processing is performed for each codeword.

A structure of a radio frame in the present embodiment will be described.

In the present embodiment, two radio frame structures are supported. The two radio frame structures are Frame structure Type 1 and Frame structure Type 2. Frame structure Type 1 is applicable to FDD. Frame structure Type 2 is applicable to TDD.

Figure 3:
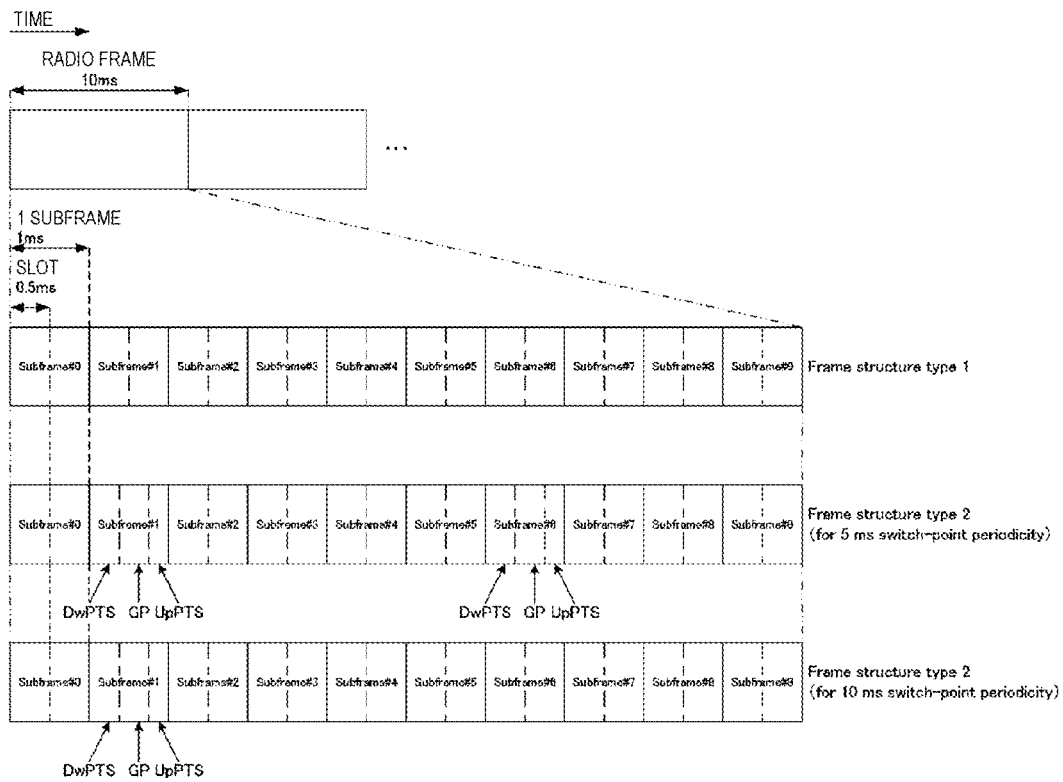
FIG. 3 is a diagram illustrating a schematic configuration of a radio frame according to the present embodiment.

FIG. 3 is a diagram illustrating a schematic configuration of a radio frame according to the present embodiment. In FIG. 3, the horizontal axis is a time axis. Each of radio frames of type 1 and type 2 is 10 ms in length, and is defined by 10 subframes. Each of the subframes is 1 ms in length and is defined by two consecutive slots. Each of the slots is 0.5 ms in length. The i-th subframe within a radio frame includes the (2×i)-th slot and the (2×i+1)-th slot.

The number of symbols included in one subframe described above may be defined based on a Subcarrier Spacing for a physical channel used for transmission and/or reception. For example, in a case that the subcarrier spacing is 15 kHz, the number of symbols included in one subframe may be 14. In a case that the subcarrier spacing is 30 kHz, the number of symbols included in one subframe may be 28. Here, the subcarrier spacing may be any of 3.75 kHz, 7.5 kHz, 15 kHz, 30 kHz, 60 kHz, 120 kHz, and 240 kHz. Obviously, a reduced subcarrier spacing increases a symbol length, and an increased subcarrier spacing reduces the symbol length. The symbol used for the uplink transmission is an OFDM (CP-OFDM, Cyclic Prefix-OFDM) symbol, or an SC-FDMA (DFT-S-OFDM) symbol. The symbol used for the downlink transmission is the OFDM symbol symbol. The subframe may include one or more slots.

Following three types of subframes are defined for Frame structure Type 2.

Downlink subframe
Uplink subframe
Special subframe

The downlink subframe is a subframe reserved for the downlink transmission. The uplink subframe is a subframe reserved for the uplink transmission. The special subframe includes three fields. The three fields are a Downlink Pilot Time Slot (DwPTS), a Guard Period (GP), and an Uplink Pilot Time Slot (UpPTS). The sum of lengths of the DwPTS, the GP, and the UpPTS is 1 ms. The DwPTS is a field reserved for the downlink transmission. The UpPTS is a field reserved for the uplink transmission. The GP is a field in which neither the downlink transmission nor the uplink transmission is performed. Moreover, the special subframe may include only the DwPTS and the GP, or may include only the GP and the UpPTS.

Figures 4, 5:
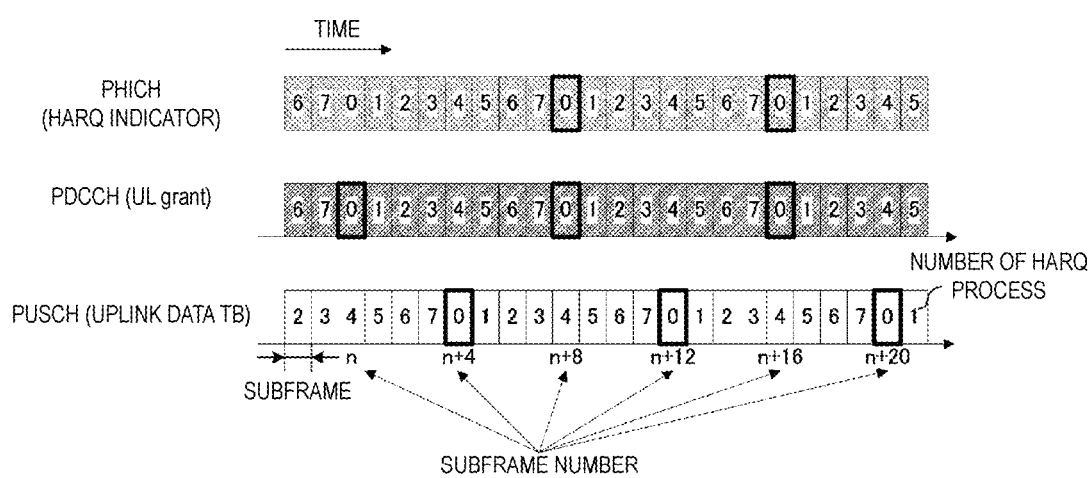
FIG. 4 is a table illustrating an example of a UL-DL configuration according to the present embodiment.
FIG. 5 is a diagram illustrating an example of a synchronous HARQ according to the present embodiment.

A radio frame of Frame structure Type 2 includes at least the downlink subframe, the uplink subframe, and the special subframe. The constitution of the radio frame of Frame structure Type 2 is indicated by an uplink-downlink configuration (UL-DL configuration). The terminal apparatus 1 receives information indicating the UL-DL configuration from the base station apparatus 3. FIG. 4 is a table illustrating an example of the UL-DL configuration according to the present embodiment. In FIG. 4, D denotes a downlink subframe, U denotes an uplink subframe, and S denotes a special subframe.

Monitoring of the PDCCH will be described below.

The monitoring means an attempt to decode the PDCCH in accordance with a certain DCI format. The PDCCH is transmitted on a PDCCH candidate. The terminal apparatus 1 monitors a set of PDCCH candidates in the serving cell. The set of PDCCH candidates is referred to as a search space. The search space and/or the types of the search space include at least a Common Search Space (CSS) and a UE-specific Search Space (USS). The UE-specific search space is derived at least from the value of the C-RNTI set by the terminal apparatus 1. That is, the UE-specific search space is separately derived for each terminal apparatus 1. The common search space is a search space common to the multiple terminal apparatuses 1, and is constituted by a Control Channel Element (CCE) with a predetermined index. The CCE includes multiple resource elements.

A transmission timing of the HARQ-ACK for the downlink transmission (PDSCH) according to the present embodiment will be described.

For the transmission timing of the HARQ-ACK for the PDSCH, in a case that the terminal apparatus 1 detects the PDSCH in a subframe n-j for FDD, the terminal apparatus 1 transmits HARQ-ACK for the PDSCH in a subframe n. That is, the transmission timing of the HARQ-ACK for the PDSCH corresponds to the j-th succeeding subframe from the subframe in which the PDSCH has been transmitted.

Now, the transmission timing for the PUSCH for the uplink grant according to the present embodiment will be described.

For a transmission timing of the PUSCH for the uplink grant, in a case that the terminal apparatus 1 detects the PDCCH (uplink grant) in the subframe n for FDD, the terminal apparatus 1 transmits the PUSCH for the uplink grant in a subframe n+k. That is, the transmission timing of the PUSCH for the uplink grant corresponds to the k-th succeeding subframe from the subframe in which the uplink grant has been detected.

For the FDD, k and j may be 4. k and j that are each 4 may be referred to as normal timings (normal processing time). With the normal processing time, the transmission timing of the HARQ-ACK for the PDSCH and the transmission timing of the PUSCH for the uplink grant each correspond to four subframes.

The value of k and/or j may be a value smaller than 4. For example, the value of k and/or j may be 3. The value of k and/or j may be determined depending on the processing capability of the terminal apparatus 1. k and j that are each smaller than 4 may be referred to as a reduced timing (reduced processing time, short processing time). With the reduced processing time, the transmission timing of the HARQ-ACK for the PDSCH and the transmission timing of the PUSCH for the uplink grant correspond to fewer than four subframes. That is, the shortening processing capability of the terminal apparatus 1 is the capability of transmitting and/or receiving data by using the reduced processing time. Here, the value of k and/or j is defined by specifications or the like, and may be a value known to the base station apparatus 3 and the terminal apparatus 1.

Here, the processing capability of the terminal apparatus 1 may be indicated by capability information about the terminal apparatus 1. In the present embodiment, shortening capability information about the terminal apparatus 1 may be capability information about the terminal apparatus 1 associated with support (or non-support) of the capability of shortening the normal processing time. The terminal apparatus 1 with the shortening processing capability can transmit and/or receive data by using a processing time (reduced processing time) shorter than the normal processing time.

In a case that the base station apparatus 3 (EUTRAN) needs the capability information about the terminal apparatus 1, the base station apparatus 3 initiates a procedure related to acquisition of the capability information about the terminal apparatus 1 in a connected mode (that is, the terminal apparatus 1 for which an RRC connection is established). The base station apparatus 3 queries the capability information (e.g., the shortening processing capability) about the terminal apparatus 1. The terminal apparatus 1 transmits the capability information about the terminal apparatus 1 to the base station apparatus 3 in response to the query. The base station apparatus 3 determines whether the terminal apparatus 1 corresponds to a prescribed capability, based on the capability information about the terminal apparatus 1. In a case that the terminal apparatus 1 supports the prescribed capability, the base station apparatus 3 transmits configuration information corresponding to the prescribed capability to the terminal apparatus 1 by using higher layer signaling or the like. Based on whether the configuration information corresponding to the capability information is configured, the terminal apparatus 1 determines whether to perform transmission and/or reception base on the capability or to perform transmission and/or reception without base on the capability. For example, the configuration information corresponding to the shortening processing capability may be defined as an RRC layer parameter shortProcessingTime. The terminal apparatus 1 configured with the RRC layer parameter shortProcessingTime may transmit and/or receive data by using the reduced processing time. The terminal apparatus 1 not configured with the RRC layer parameter shortProcessingTime may transmit and/or receive data using the normal processing time.

The RRC layer parameter shortProcessingTime is a parameter indicating whether or not to perform data transmission and/or reception based on the reduced processing time in a certain serving cell. Here, configuration of the RRC parameter shortProcessingTime indicates that the value of the parameter shortProcessingTime transmitted by the higher layer signaling is True. The parameter shortProcessingTime configured to a value True may also include transmission and/or reception using the reduced processing time (e.g., 3 ms). A lack of configuration of the RRC parameter shortProcessingTime may indicate that the value of the parameter shortProcessingTime transmitted by the higher layer signaling is False or that the received higher layer signaling (higher layer information) does not include the RRC parameter shortProcessingTime. The parameter shortProcessingTime configured to a value False may also include transmission and/or reception using the normal processing time (e.g., 4 ms).

Note that the RRC parameter shortProcessingTime may be defined for the serving cell. That is, the base station apparatus 3 may transmit (notify), to the terminal apparatus 1, information about whether or not the RRC parameter shortProcessingTime is configured for each serving cell. The terminal apparatus 1 not configured with the RRC parameter shortProcessingTime for a certain serving cell may perform transmission and/or reception by using the normal processing time in the serving cell. The terminal apparatus 1 configured with the RRC parameter shortProcessingTime for a certain serving cell may perform transmission and/or reception by using the reduced processing time (e.g., 3 ms) in the serving cell. Here, in a case that the downlink assignment or the uplink grant in the serving cell configured with the RRC parameter shortProcessingTime is detected in the common search space, the terminal apparatus 1 may perform transmission and/or reception by using the normal processing time. In a case that the downlink assignment or the uplink grant in the serving cell is detected in the UE-specific search space, the terminal apparatus 1 may perform transmission and/or reception by using the reduced processing time. Whether to configure the RRC parameter shortProcessingTime for a certain serving cell is optional for higher layer (RRC).

The RRC parameter shortProcessingTime may be defined for each PUCCH Group. The base station apparatus 3 may transmit (notify), to the terminal apparatus 1, information about whether the RRC parameter shortProcessingTime is configured for each PUCCH group. The configuration related to the RRC parameter shortProcessingTime may be applied to each of the serving cells belonging to the same PUCCH Group. For example. the terminal apparatus 1 configured with the RRC parameter shortProcessingTime for a certain PUCCH group may perform transmission and/or reception by using the reduced processing time in a serving cell belonging to the PUCCH group. The terminal apparatus 1 not configured with the RRC parameter shortProcessingTime for a certain PUCCH group may perform transmission and/or reception by using the normal processing time in a serving cell belonging to the PUCCH group. Here, in a case that the downlink assignment or the uplink grant in the serving cell belonging to the PUCCH group configured with the RRC parameter shortProcessingTime is detected in the common search space, the terminal apparatus 1 may perform transmission and/or reception by using the normal processing time. In a case that the downlink assignment or the uplink grant in the serving cell belonging to the PUCCH group configured with the RRC parameter shortProcessingTime is detected in the UE-specific search space, the terminal apparatus 1 may perform transmission and/or reception by using the reduced processing time.

The PUCCH group includes a Primary PUCCH Group and a Secondary PUCCH Group. The primary PUCCH group is a group of multiple serving cells including a primary cell for which the PUCCH is configured. The secondary PUCCH group is a group of multiple secondary cells including at least a secondary cell configured with the PUCCH.

Hereinafter, the types of the DCI format will be described.

The DCI format includes DCI format 0, DCI format 0C, and DCI format 0D. Each of DCI format 0, DCI format 0C, and DCI format 0D includes the uplink grant and is used for scheduling of the PUSCH in one cell. The uplink grant included in DCI format 0, DCI format 0C, and DCI format 0D is also referred to as the uplink grant included in the PDCCH. DCI format 0 may be used for the synchronous HARQ and the asynchronous HARQ. DCI format 0C and DCI format 0D may be used for the asynchronous HARQ. DCI format 0C and DCI format 0D are not used for the synchronous HARQ.

DCI format 0 does not include a "Repetition number" field, a "Redundancy version" field and an "HARQ process number" field. The terminal apparatus 1 performs transmission of the PUSCH in one subframe, based on detection of the PDCCH including DCI format 0.

DCI format 0C includes the "Repetition number" field and the "HARQ process number" field. The terminal apparatus 1 configured with an RRC layer parameter PUSCHEnh-Configuration for the serving cell performs transmission of the PUSCH in a set of subframes, based on detection of the PDCCH including DCI format 0C. The set of subframes includes one or more subframes. The number of subframes included in the set of subframes is given by the "Repetition number" field. The transmission of the PUSCH scheduled by DCI format 0C may be performed repeatedly in multiple subframes. The transmission of the PUSCH scheduled by DCI format 0C may be performed in one subframe. The "HARQ process number" field is used by the HARQ entity to identify the HARQ process.

DCI format 0D includes the uplink grant and is used for scheduling of the PUSCH. DCI format 0D includes the "Redundancy version" field and the "HARQ process number" field. Here, DCI format 0D may be used for scheduling of the PUSCH in a serving cell configured with the reduced processing time. The transmission of the PUSCH scheduled by DCI format 0D may be performed in one subframe. The "HARQ process number" field is used by the HARQ entity to identify the HARQ process. Note that each of DCI format 0, DCI format 0C, and DCI format 0D may be referred to as the uplink grant.

The terminal apparatus 1 not configured with the RRC layer parameter PUSCHEnh-Configuration for the serving cell may decode the PDCCH including DCI format 0 in the common search space and UE-specific search space in the serving cell. The terminal apparatus 1 configured with the RRC layer parameter PUSCHEnh-Configuration for the serving cell may decode the PDCCH including DCI format 0 in the common search space in the serving cell and decode the PDCCH including DCI format 0C in the UE-specific search space in the serving cell. The terminal apparatus 1 configured with the RRC layer parameter PUSCHEnh-Configuration for the serving cell need not decode the PDCCH including DCI format 0 in the UE-specific search space in the serving cell.

In a case that the RRC layer parameter PUSCHEnh-Configuration for the serving cell is not configured, the synchronous HARQ may be applied to the uplink of the serving cell. In a case that the RRC layer parameter PUSCHEnh-Configuration for the serving cell is configured, the asynchronous HARQ may be applied to the uplink of the serving cell. Configuration of the RRC layer parameter PUSCHEnh-Configuration is also referred to as configuration of a PUSCH enhancement mode. A lack of configuration of the RRC layer parameter PUSCHEnh-Configuration is also referred to as a lack of configuration of the PUSCH enhancement mode. The terminal apparatus 1 may configure the RRC layer parameter PUSCHEnh-Configuration, based on RRC layer information received from the base station apparatus 3. The terminal apparatus 1 may release the RRC layer parameter PUSCHEnh-Configuration, based on the RRC layer information received from the base station apparatus 3.

The terminal apparatus 1 not configured with the RRC layer parameter shortProcessingTime for the serving cell may decode the PDCCH including DCI format 0 in the common search space and UE-specific search space in the serving cell. The terminal apparatus 1 not configured with the RRC layer parameter shortProcessingTime for the serving cell need not decode the PDCCH including DCI format 0D in the UE-specific search space in the serving cell. DCI format 0 may be used for the uplink synchronous HARQ.

The terminal apparatus 1 configured with the RRC layer parameter shortProcessingTime for the serving cell may decode the PDCCH including DCI format 0 in the common search space in the serving cell and decode the PDCCH including DCI format 0D in the UE-specific search space in the serving cell. The terminal apparatus 1 configured with the RRC layer parameter shortProcessingTime for the serving cell need not decode the PDCCH including DCI format 0 in the UE-specific search space in the serving cell. DCI format 0D may be used for the uplink asynchronous HARQ. DCI format 0D is not used for the uplink synchronous HARQ. The number of the uplink HARQ process is provided by the HARQ process number "field included in DCI format 0D. For FDD, the terminal apparatus 1 may transmit the PUSCH in the third succeeding subframe from the subframe in which the PDCCH has been decoded, based on decoding of the PDCCH including DCI format 0D in the UE-specific search space. Based on decoding of the PDCCH including DCI format 0 in the common search space, the terminal apparatus 1 may transmit the PUSCH in the fourth succeeding subframe from the subframe in which the PDCCH has been decoded.

In a case of detecting the PDCCH (uplink grant, DCI format 0, or DCI format 0D) in a subframe n, the terminal apparatus 1 transmits the PUSCH for the uplink grant in a subframe n+k. In a case that the RRC layer parameter shortProcessingTime for the serving cell is not configured and that the PDCCH (uplink grant or DCI format 0) is detected in the common search space and UE-specific search space in the subframe n, k may be 4. In a case that the RRC layer parameter shortProcessingTime for the serving cell is configured and that the PDCCH (uplink grant or DCI format 0) is detected in the common search space in the subframe n, k may be 4. In a case that the RRC layer parameter shortProcessingTime for the serving cell is configured and that the PDCCH (uplink grant or DCI format 0D) is detected in the UE-specific search space in the subframe n, k may be 3.

In a case that the PDCCH including an RA-RNTI is detected in the subframe n, the terminal apparatus 1 may receive the PDSCH including a random access response in the subframe n. Here, the downlink assignment included in the PDCCH including the RA-RNTI is used for scheduling of the PDSCH including the random access response.

The uplink grant included in the random access response is referred to as a random access response grant. The random access response grant is used for scheduling of the PUSCH. The uplink grant included in the random access response corresponding to a contention based random access procedure does not include the "Repetition number" field and the "HARQ process number" field. The uplink grant included in the random access response corresponding to a non-contention based random access procedure does not include the "HARQ process number" field. The uplink grant included in the random access response corresponding to the non-contention based random access procedure and provided for the terminal apparatus 1 not configured with the RRC layer parameter PUSCHEnh-Configuration does not include the "Repetition number" field. The uplink grant included in the random access response corresponding to the non-contention based random access procedure and provided for the terminal apparatus 1 configured with the RRC layer parameter PUSCHEnh-Configuration includes the "Repetition number" field.

The uplink grant included in the random access response corresponding to the non-contention based random access procedure and provided for the terminal apparatus 1 not configured with the RRC layer parameter shortProcessingTime does not include the "HARQ process number" field. The uplink grant included in the random access response corresponding to the non-contention based random access procedure and provided for the terminal apparatus 1 configured with the RRC layer parameter shortProcessingTime need not include the "HARQ process number" field. That is, the uplink grant included in the random access response corresponding to the non-contention based random access procedure need not include the "HARQ process number" field regardless of whether or not the RRC layer parameter shortProcessingTime is configured. In other words, the uplink grant included in the random access response corresponding to the non-contention based random access procedure may be used for the uplink synchronous HARQ regardless of whether the RRC layer parameter shortProcessingTime is configured.

In a case that the PDCCH including the RA-RNTI is detected in the subframe n, the terminal apparatus 1 transmits, based on information (random access response grant) included in the random access response, the PUSCH in a first available uplink subframe (first available subframe) n+k (k≥6) for PUSCH transmission or in a next available uplink subframe succeeding the first available uplink subframe n+k for the PUSCH transmission.

In a case that a delay field included in the random access response grant is set to 0, the PUSCH is transmitted in the first available uplink subframe n+k (k≥6) for the PUSCH transmission. In a case that the delay field included in the random access response grant is set to 1, the PUSCH is transmitted in the next available uplink subframe succeeding the first available uplink subframe n+k (k≥6) for the PUSCH transmission.

The random access procedure will be described below. In this regard, the types of the random access procedure include at least a contention based random access procedure and a non-contention based random access procedure.

In the present embodiment, the random access procedure may be performed in the primary cell. However, only one random access procedure is performed at any point in the time domain. That is, multiple random access procedures are not performed simultaneously.

In the present embodiment, the contention based random access procedure and the non-contention based random access procedure may be performed in the primary cell.

A random access preamble may be transmitted on the PRACH in the primary cell. The terminal apparatus 1 receives from the base station apparatus 3 information (RRC message) on the random access procedure in the primary cell. The information on the random access procedure in the primary cell includes information indicating a set of PRACH resources in the primary cell.

In a case of the contention based random access procedure, the terminal apparatus 1 itself selects an index of the random access preamble. In a case of a non-contention based random access procedure, the terminal apparatus 1 selects the index of the random access preamble, based on information received from the base station apparatus 3. In this regard, the information received by the terminal apparatus 1 from the base station apparatus 3 may be included in the PDCCH. In a case that the values of the bits of information received from the base station apparatus 3 are all 0, the terminal apparatus 1 performs the contention based random access procedure, and the terminal apparatus 1 itself selects the index of the random access preamble.

The random access response for the primary cell is transmitted on the PDSCH in the primary cell. The PDSCH corresponds to the PDCCH including RA-RNTI. The random access response includes an uplink grant field mapped to the uplink grant and a Temporary C-RNTI field mapped to information for indicating the Temporary C-RNTI.

In a case that the received random access response includes a random access preamble identifier corresponding to the transmitted random access preamble and that the terminal apparatus 1 selects the random access preamble, based on the information received from the base station apparatus 3, the terminal apparatus 1 assumes that the non-contention based random access procedure has been successfully completed, and transmits the PUSCH, based on the uplink grant included in the random access response.

In a case that the received random access response includes a random access preamble identifier corresponding to the transmitted random access preamble and that the terminal apparatus 1 itself selects the random access preamble, the terminal apparatus 1 sets the value in the Temporary C-RNTI field included in the random access response via which the Temporary C-RNTI has been received, and transmits random access message 3 in the PUSCH, based on the uplink grant included in the random access response.

The PUSCH corresponding to the uplink grant included in the random access response is transmitted in the serving cell in which the corresponding preamble is transmitted in the PRACH.

In a case that Temporary C-RNTI is not set, the PUSCH corresponding to the uplink grant included in the random access response and the PUSCH retransmission of the same transport block are scrambled, based on the C-RNTI.

In a case that the Temporary C-RNTI is set, the PUSCH corresponding to the uplink grant included in the random access response and the PUSCH retransmission of the same transport block are scrambled, based on the Temporary C-RNTI.

In a case that Temporary C-RNTI is set, the PUSCH retransmission of the transport block transmitted in the PUSCH corresponding to the uplink grant included in the random access response is scheduled by DCI format 0 to which CRC parity bits scrambled with Temporary C-RNTI are added. DCI format 0 is transmitted on the PDCCH in the Common Search Space.

Hereinafter, the synchronous HARQ in the uplink will be described.

In the synchronous HARQ, the HARQ process to which the uplink grant corresponds is associated with a subframe in which the uplink grant has been received and/or a subframe in which PUSCH (UL-SCH) corresponding to the uplink grant is transmitted. In the synchronous HARQ, the terminal apparatus 1 derives the HARQ process to which the uplink grant corresponds from the subframe in which the uplink grant has been received and/or the subframe in which PUSCH (UL-SCH) corresponding to the uplink grant is transmitted. That is, in the synchronous HARQ, the HARQ entity may identify the HARQ process to which the uplink grant corresponds without using the information included in the uplink grant.

FIG. 5 illustrates an example of the synchronous HARQ according to the present embodiment. In FIG. 5, one subframe corresponds to one HARQ process. In FIG. 5, numbers in rectangles indicate the numbers of corresponding HARQ processes. In the synchronous HARQ, the HARQ entity derives the HARQ process from a subframe in which UL-SCH data in the MAC layer is transmitted or a subframe in which DCI format 0 corresponding to the UL-SCH data in the MAC layer has been detected.

In FIG. 5, the subframe in which the MAC layer data corresponding to the uplink grant is transmitted is derived from the subframe in which the uplink grant has been received. For example, the UL-SCH data in the MAC layer corresponding to the uplink grant may be transmitted on the PUSCH in the fourth succeeding subframe from the subframe in which the uplink grant has been received.

In synchronous HARQ, the HARQ indicator is transmitted on the PHICH in response to an uplink transmission. The correspondence between the subframe in which the uplink transmission has been performed and the subframe in which the corresponding PHICH is transmitted is predetermined. For example, the HARQ indicator for the MAC layer data is transmitted on the PHICH in the fourth succeeding subframe from the subframe in which the MAC layer data has been transmitted on the PUSCH. For example, the MAC layer data is retransmitted on the PUSCH in the fourth succeeding subframe from the subframe in which the NACK has been received on the PHICH.

Hereinafter, the asynchronous HARQ in the uplink will be described.

Figure 6:
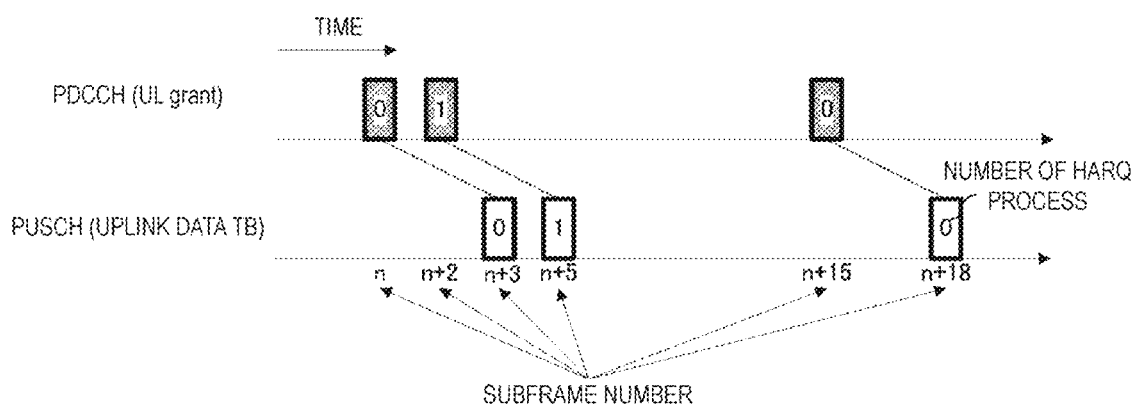
FIG. 6 is a diagram illustrating an example of an asynchronous HARQ according to the present embodiment.

FIG. 6 is a diagram illustrating an example of the asynchronous HARQ according to the present embodiment. In FIG. 6, one subframe corresponds to one HARQ process. In FIG. 6, numbers in rectangles indicate the number of corresponding HARQ processes. In the asynchronous HARQ, in a case that the uplink grant (DCI format 0C and/or DCI format 0D) is included in the PDCCH mapped to a UE-specific search space, the HARQ entity derives the HARQ process from an "HARQ process number" field. In the asynchronous HARQ, in a case that the uplink grant (DCI format 0) is included in the PDCCH mapped to the common search space, the HARQ entity may use an HARQ process with a specific number. In the asynchronous HARQ, in a case that the uplink grant is included in a random access response, the HARQ entity may use HARQ process with a specific number. The specific number may be 0. The specific number may be a predetermined number.

In the asynchronous HARQ, the HARQ indicator is not transmitted on the PHICH in response to the uplink transmission. In other words, in the asynchronous HARQ, retransmissions of the MAC layer data (transport block) are always scheduled via the PDCCH. In FIG. 6, the subframe in which the MAC layer data corresponding to the uplink grant is transmitted is derived from the subframe in which the uplink grant has been received. For example, with the reduced processing time, MAC layer data corresponding to the uplink grant may be transmitted on the PUSCH in the third succeeding subframe from the subframe in which the uplink grant has been received.

In the present embodiment, whether the synchronous HARQ or the asynchronous HARQ is applied to the uplink HARQ process in a certain serving cell may be derived, based on whether the RRC layer parameter shortProcessingTime is configured for the serving cell or not. In a serving cell not configured with the RRC layer parameter shortProcessingTime, the synchronous HARQ may be applied to the uplink HARQ process. In a serving cell configured with the RRC layer parameter shortProcessingTime, the asynchronous HARQ may be applied to the uplink HARQ process. Whether the synchronous HARQ or the asynchronous HARQ is applied to the uplink HARQ process in the serving cell configured with the RRC layer parameter shortProcessingTime may be derived from the type of the search space in which the uplink grant has been received. For example, in a case that the uplink grant corresponding to the uplink HARQ process is received in the common search space, the type of uplink HARQ process may be the synchronous HARQ. In other words, the synchronous HARQ is applied to the MAC layer data corresponding to the uplink grant received in the common search space. In a case that the uplink grant corresponding to the uplink HARQ process is received in the UE-specific search space, the type of the uplink HARQ process may be the asynchronous HARQ. In other words, the asynchronous HARQ is applied to the MAC layer data corresponding to the uplink grant received in the UE-specific search space. In a serving cell configured with the RRC layer parameter shortProcessingTime, in a case that the uplink grant for the initial transmission of the transport block is included in the random access response corresponding to the non-contention based random access procedure, the synchronous HARQ is applied to the HARQ process corresponding to the uplink grant.

In other words, the terminal apparatus 1 may identify the HARQ process to which the uplink grant corresponds, based at least on (1) the type of the search space to which the PDCCH including the uplink grant is mapped, (2) whether the uplink grant is included in the random access response or the PDCCH, (3) whether the RRC layer parameter PUSCHEnh-Configuration is configured, and/or (4) whether the RRC layer parameter shortProcessingTime is configured.

Hereinafter, decoding of PDCCH for retransmission of the HARQ will be described.

FIGS. 7 and 8 illustrate pseudo codes related to decoding of the PDCCH for retransmission of the HARQ. In FIGS. 7 and 8, the PDCCH is a PDCCH including the uplink grant. The assumption by the terminal apparatus 1 that the PDCCH occurs in a specific search space means that the terminal apparatus 1 attempts to decode the PDCCH in the specific search space and the base station apparatus 3 transmits the PDCCH in the specific search space. The assumption by the terminal apparatus 1 that the PDCCH occurs in the common search space or the UE-specific search space means that the terminal apparatus 1 attempts to decode the PDCCH in the common search space and the UE-specific search space and the base station apparatus 3 transmits the PDCCH in one of multiple PDCCH candidates corresponding to the common search space and the UE-specific search space.

The initial PUSCH transmission for the transport block means that the transport block is initially transmitted using the PUSCH. The PUSCH retransmission for the transport block means retransmission of the transport block using the PUSCH.

The terminal apparatus 1 and the base station apparatus 3 may determine which of processing A to processing C is to be performed, based at least on (1) the type of the random access procedure to which the random access response grant including the uplink grant for initial PUSCH transmission for the transport block corresponds, (2) the type of the search space to which the PDCCH including the uplink grant is mapped, (3) whether the uplink grant is included in the random access response or the PDCCH, (4) whether or not the RRC layer parameter PUSCHEnh-Configuration is configured, and/or (5) whether or not the RRC layer parameter shortProcessingTime is configured.

In other words, the terminal apparatus 1 may determine which type of search space decoding of the PDCCH for PUSCH retransmission of the transport block is attempted in, based at least on (1) the type of the random access procedure to which the random access response grant including the uplink grant for initial PUSCH transmission for the transport block corresponds, (2) the type of the search space to which the PDCCH including the uplink grant is mapped, (3) whether the uplink grant is included in the random access response or the PDCCH, (4) whether or not the RRC layer parameter PUSCHEnh-Configuration is configured, and/or (5) whether or not the RRC layer parameter shortProcessingTime is configured.

In other words, the base station apparatus 3 may determine which type of search space the PDCCH for PUSCH retransmission of the transport block is transmitted in, based at least on (1) the type of the random access procedure to which the random access response grant including the uplink grant for initial PUSCH transmission for the transport block corresponds, (2) the type of the search space to which the PDCCH including the uplink grant is mapped, (3) whether the uplink grant is included in the random access response or the PDCCH, (4) whether or not the RRC layer parameter PUSCHEnh-Configuration is configured, and/or (5) whether or not the RRC layer parameter shortProcessingTime is configured.

In a case that a condition A is satisfied, the terminal apparatus 1 and the base station apparatus 3 perform the processing A. In a case that a condition B is satisfied and at least one of a condition C and a condition D is satisfied, the terminal apparatus 1 and the base station apparatus 3 perform the processing B. In a case that a condition E is satisfied and at least one of a condition F and a condition G is satisfied, the terminal apparatus 1 and the base station apparatus 3 perform the processing C. In a case that the condition E and a condition H are satisfied, the terminal apparatus 1 and the base station apparatus 3 perform the processing A. In a case that a condition I is satisfied and at least one of the condition C and the condition D is satisfied, the terminal apparatus 1 and the base station apparatus 3 perform the processing B. In a case that a condition J and the condition F are satisfied, the terminal apparatus 1 and the base station apparatus 3 perform the processing C. In a case that the condition J is satisfied and at least one of the condition H and the condition G is satisfied, the terminal apparatus 1 and the base station apparatus 3 perform the process A.

In the processing A, the terminal apparatus 1 assumes that the PDCCH for PUSCH retransmission of the transport block occurs in the common search space. In the processing B, the terminal apparatus 1 assumes that the PDCCH for PUSCH retransmission of the transport block occurs in the common search space or UE-specific search space. In the process C, the terminal apparatus 1 assumes that the PDCCH for PUSCH retransmission of the transport block occurs in the UE-specific search space.

The condition A is that the initial PUSCH transmission for the transport block is scheduled by the uplink grant included in the random access response corresponding to the contention based random access procedure. The condition A may be that the uplink grant for initial PUSCH transmission for the transport block is included in the random access response corresponding to the contention based random access procedure.

The condition B is that the RRC layer parameter PUSCHEnh-Configuration is not configured for the terminal apparatus 1. The condition C is that the PDCCH for initial PUSCH transmission for the transport block has been decoded. The condition D and the condition G are that the initial PUSCH transmission for the transport block is scheduled by the uplink grant included in the random access response grant corresponding to the non-contention based random access procedure. The condition E is that the RRC layer parameter PUSCHEnh-Configuration is configured for the terminal apparatus 1. The condition F is that the PDCCH for initial PUSCH transmission for the transport block has been decoded in the UE-specific search space. The condition H is that the PDCCH for initial PUSCH transmission for the transport block has been decoded in the common search space. The condition I is that the RRC layer parameter shortProcessingTime is not configured for the terminal apparatus 1. The condition J is that the RRC layer parameter shortProcessingTime is configured for the terminal apparatus 1.

Configurations of apparatuses according to the present embodiment will be described below.

Figure 9:
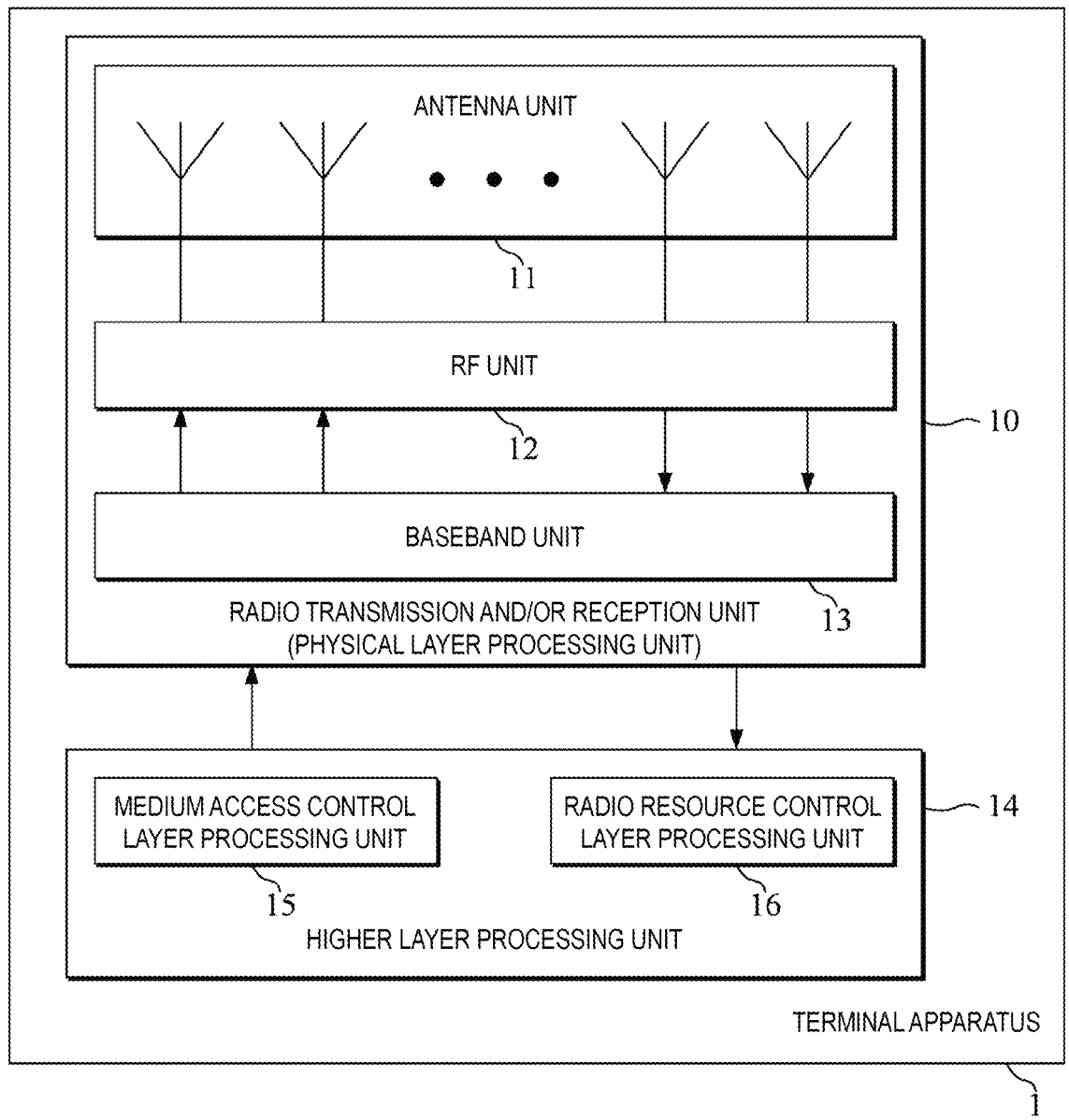
FIG. 9 is a schematic block diagram illustrating a configuration of a terminal apparatus 1 according to the present embodiment.

FIG. 9 is a schematic block diagram illustrating a configuration of the terminal apparatus 1 according to the present embodiment. As illustrated, the terminal apparatus 1 is configured to include a radio transmission and/or reception unit 10 and a higher layer processing unit 14. The radio transmission and/or reception unit 10 is configured to include an antenna unit 11, a Radio Frequency (RF) unit 12, and a baseband unit 13. The higher layer processing unit 14 is configured to include a medium access control layer processing unit 15 and a radio resource control layer processing unit 16. The radio transmission and/or reception unit 10 is also referred to as a transmitter, a receiver or a physical layer processing unit.

The higher layer processing unit 14 outputs uplink data (transport block) generated by a user operation or the like, to the radio transmission and/or reception unit 10. The higher layer processing unit 14 performs processing of the Medium Access Control (MAC) layer, a Packet Data Convergence Protocol (PDCP) layer, a Radio Link Control (RLC) layer, and the Radio Resource Control (RRC) layer.

The medium access control layer processing unit 15 included in the higher layer processing unit 14 performs processing of the Medium Access Control layer. The medium access control layer processing unit 15 controls HARQ in accordance with the various pieces of configuration information/parameters managed by the radio resource control layer processing unit 16. The medium access control layer processing unit 15 manages multiple HARQ entities, multiple HARQ processes, and multiple HARQ buffers.

The radio resource control layer processing unit 16 included in the higher layer processing unit 14 performs processing of the Radio Resource Control layer. The radio resource control layer processing unit 16 manages various types of configuration information/parameters of its own apparatus. The radio resource control layer processing unit 16 sets the various pieces of configuration information/parameters in accordance with RRC layer signaling received from the base station apparatus 3. That is, the radio resource control layer processing unit 16 sets the various configuration information/parameters in accordance with the information indicating the various configuration information/parameters received from the base station apparatus 3.

The radio transmission and/or reception unit 10 performs processing of the physical layer, such as modulation, demodulation, coding, decoding, and the like. The radio transmission and/or reception unit 10 demultiplexes, demodulates, and decodes a signal received from the base station apparatus 3, and outputs the information resulting from the decoding to the higher layer processing unit 14. The radio transmission and/or reception unit 10 generates a transmit signal by modulating and coding data, and performs transmission to the base station apparatus 3.

The RF unit 12 converts (down converts) a signal received via the antenna unit 11 into a baseband signal by orthogonal demodulation and removes unnecessary frequency components. The RF unit 12 outputs the processed analog signal to the baseband unit.

The baseband unit 13 converts the analog signal input from the RF unit 12 into a digital signal. The baseband unit 13 removes a portion corresponding to a Cyclic Prefix (CP) from the digital signal resulting from the conversion, performs Fast Fourier Transform (FFT) of the signal from which the CP has been removed, and extracts a signal in the frequency domain.

The baseband unit 13 generates an SC-FDMA symbol by performing Inverse Fast Fourier Transform (IFFT) of the data, adds CP to the generated SC-FDMA symbol, generates a baseband digital signal, and converts the baseband digital signal into an analog signal. The baseband unit 13 outputs the analog signal resulting from the conversion, to the RF unit 12.

The RF unit 12 removes unnecessary frequency components from the analog signal input from the baseband unit 13 using a low-pass filter, up-converts the analog signal into a signal of a carrier frequency, and transmits the up-converted signal via the antenna unit 11. The RF unit 12 amplifies power. The RF unit 12 may have a function of controlling transmit power. The RF unit 12 is also referred to as a transmit power control unit.

Figure 10:
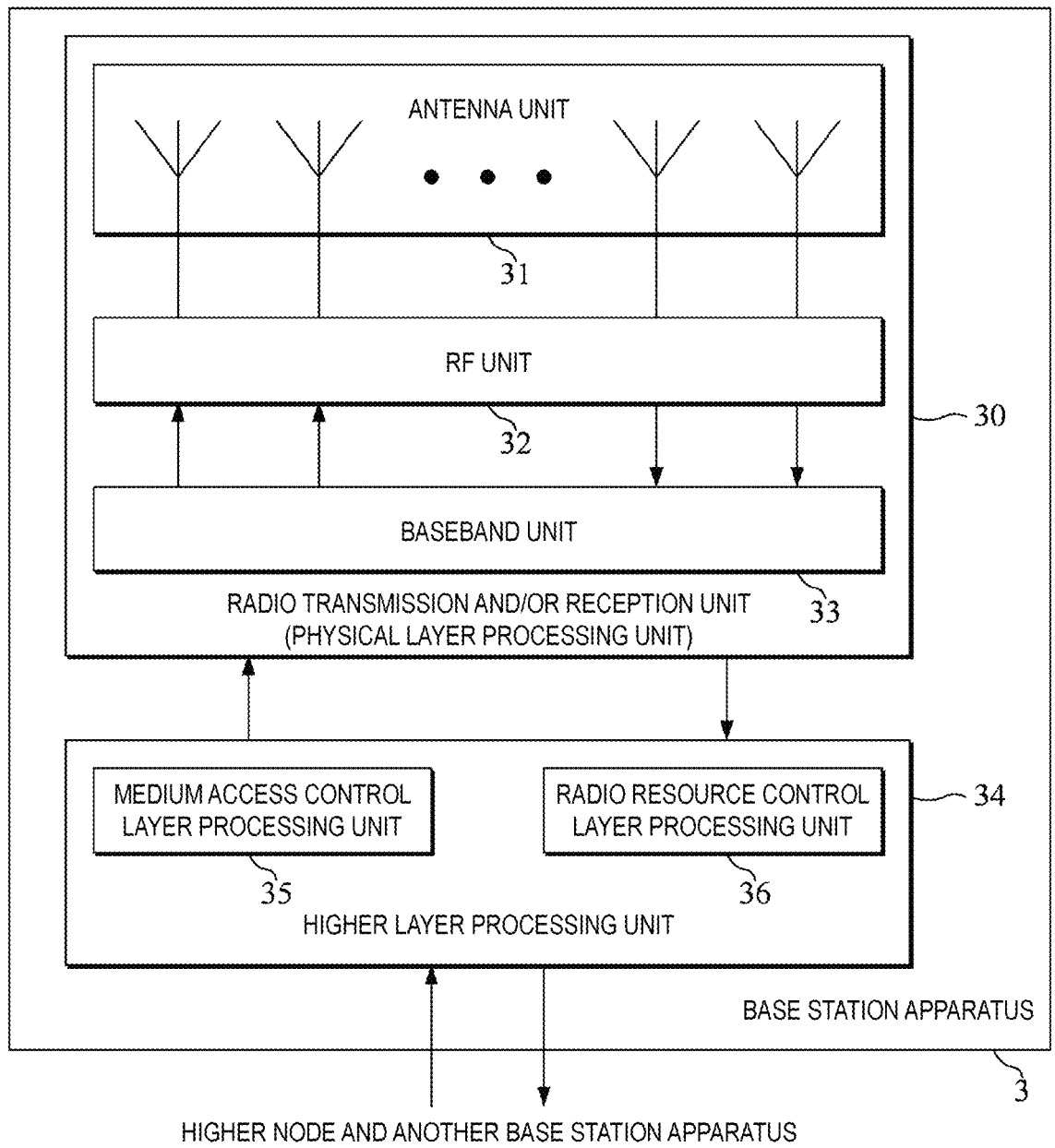
FIG. 10 is a schematic block diagram illustrating a configuration of a base station apparatus 3 according to the present embodiment.

FIG. 10 is a schematic block diagram illustrating a configuration of the base station apparatus 3 according to the present embodiment. As illustrated, the base station apparatus 3 is configured to include a radio transmission and/or reception unit 30 and a higher layer processing unit 34. The radio transmission and/or reception unit 30 is configured to include an antenna unit 31, an RF unit 32, and a baseband unit 33. The higher layer processing unit 34 is configured to include a medium access control layer processing unit 35 and a radio resource control layer processing unit 36. The radio transmission and/or reception unit 30 is also referred to as a transmitter, a receiver or a physical layer processing unit.

The higher layer processing unit 34 performs processing of the Medium Access Control (MAC) layer, a Packet Data Convergence Protocol (PDCP) layer, a Radio Link Control (RLC) layer, and the Radio Resource Control (RRC) layer.

The medium access control layer processing unit 35 included in the higher layer processing unit 34 performs processing of the Medium Access Control layer. The medium access control layer processing unit 15 controls HARQ in accordance with the various pieces of configuration information/parameters managed by the radio resource control layer processing unit 16. The medium access control layer processing unit 15 generates an ACK/NACK and HARQ information with respect to uplink data (UL-SCH). The ACK/NACK and HARQ information with respect to the uplink data (UL-SCH) are transmitted to the terminal apparatus 1 on the PHICH or the PDCCH.

The radio resource control layer processing unit 36 included in the higher layer processing unit 34 performs processing of the Radio Resource Control layer. The radio resource control layer processing unit 36 generates, or acquires from a higher node, downlink data (transport block) allocated on a physical downlink shared channel, system information, an RRC message, a MAC Control Element (CE), and the like, and performs output to the radio transmission and/or reception unit 30. The radio resource control layer processing unit 36 manages various types of configuration information/parameters for each of the terminal apparatuses 1. The radio resource control layer processing unit 36 may set various types of configuration information/parameters for each of the terminal apparatuses 1 via the higher layer signal. That is, the radio resource control layer processing unit 36 transmits/broadcasts information indicating various types of configuration information/parameters.

The functionality of the radio transmission and/or reception unit 30 is similar to the functionality of the radio transmission and/or reception unit 10, and hence description thereof is omitted.

Each of the units having the reference signs 30 to 36 included in the base station apparatus 3 may be configured as a circuit. Each of the units having the reference signs 10 to 16 included in the terminal apparatus 1 may be configured as a circuit.

Hereinafter, various aspects of the terminal apparatus and the base station apparatus in the present embodiment will be described.

(1) A first aspect of the present embodiment is a terminal apparatus including a transmitter 10 configured to perform an initial transmission of a transport block, and a receiver 10 configured to select a search space, based on a type of a random access procedure to which a random access response including an uplink grant for the initial transmission of the transport block corresponds and to attempt to decode a PDCCH for retransmission of the transport block in the selected search space.

(2) A second aspect of the present embodiment is a base station apparatus including a receiver 30 configured to receive an initial transmission of a transport block, and a transmitter 30 configured to select a search space, based on a type of a random access procedure to which a random access response including an uplink grant for the initial transmission of the transport block corresponds and to transmit a PDCCH for retransmission of the transport block in the selected search space.

(3) In the first and second aspects of the present embodiment, the initial transmission is performed via a PUSCH, and the retransmission is performed via the PUSCH.

(4) In the first and second aspects of the present embodiment, the search space includes a common search space and a UE-specific search space.

(5) In the first and second aspects of the present embodiment, types of the random access procedure include a contention based random access procedure and a non-contention based random access procedure.

(6) In the first and second aspects of the present embodiment, the PDCCH includes an uplink grant for retransmission of the transport block.

(7) In the first and second aspects of the present embodiment, an RRC layer parameter PUSCHEnh-Configuration is configured for the terminal apparatus.

(8) In the first and second aspects of the present embodiment, in a case that the RRC layer parameter PUSCHEnh-Configuration corresponds to one serving cell and that the RRC layer parameter PUSCHEnh-Configuration is configured for the terminal apparatus, an asynchronous HARQ is applied to an uplink of the serving cell, and in a case that the RRC layer parameter PUSCHEnh-Configuration is not configured for the terminal apparatus, a synchronous HARQ is applied to the uplink of the serving cell.

(9) In the first aspect of the present embodiment, in a case that the RRC layer parameter PUSCHEnh-Configuration is configured for the terminal apparatus and that the random access response including the uplink grant for the initial transmission of the transport block corresponds to the non-contention based random access procedure, the receiver 10 attempts to decode the PDCCH for the retransmission of the transport block in the UE-specific search space. In this regard, the receiver 10 does not attempt to decode the PDCCH in the common search space.

(10) In the first aspect of the present embodiment, in a case that the RRC layer parameter PUSCHEnh-Configuration is configured for the terminal apparatus and that the random access response including the uplink grant for the initial transmission of the transport block corresponds to the contention based random access procedure, the receiver 10 attempts to decode the PDCCH for the retransmission of the transport block in the common search space. In this regard, the receiver 10 does not attempt to decode the PDCCH in the UE-specific search space.

(11) In the first aspect of the present embodiment, in a case that the RRC layer parameter PUSCHEnh-Configuration is not configured for the terminal apparatus and that the random access response including the uplink grant for the initial transmission of the transport block corresponds to the non-contention based random access procedure, the receiver 10 attempts to decode the PDCCH for the retransmission of the transport block in the UE-specific search space and the common search space.

(12) In the first aspect of the present embodiment, in a case that the RRC layer parameter PUSCHEnh-Configuration is not configured for the terminal apparatus and that the random access response including the uplink grant for the initial transmission of the transport block corresponds to the contention based random access procedure, the receiver 10 attempts to decode the PDCCH for the retransmission of the transport block in the common search space. In this regard, the receiver 10 does not attempt to decode the PDCCH in the UE-specific search space.

(13) In the second aspect of the present embodiment, in a case that the RRC layer parameter PUSCHEnh-Configuration is configured for the terminal apparatus and that the random access response including the uplink grant for the initial transmission of the transport block corresponds to the non-contention based random access procedure, the transmitter transmits the PDCCH for the retransmission of the transport block in the UE-specific search space.

(14) In the second aspect of the present embodiment, in a case that the RRC layer parameter PUSCHEnh-Configuration is configured for the terminal apparatus and that the random access response including the uplink grant for the initial transmission of the transport block corresponds to the contention based random access procedure, the transmitter transmits the PDCCH for the retransmission of the transport block in the common search space.

(15) In the second aspect of the present embodiment, in a case that the RRC layer parameter PUSCHEnh-Configuration is not configured for the terminal apparatus and that the random access response including the uplink grant for the initial transmission of the transport block corresponds to the non-contention based random access procedure, the transmitter transmits the PDCCH for the retransmission of the transport block in one of multiple PDCCH candidates corresponding to the UE-specific search space and the common search space.

(16) In the second aspect of the present embodiment, in a case that the RRC layer parameter PUSCHEnh-Configuration is not configured for the terminal apparatus and that the random access response including the uplink grant for the initial transmission of the transport block corresponds to the contention based random access procedure, the transmitter transmits the PDCCH for the retransmission of the transport block in the common search space.

(17) A third aspect of the present embodiment is a terminal apparatus including a receiver 10 configured to decode a PDCCH including an uplink grant, a medium access control layer processing unit 15 configured to manage multiple HARQ processes, wherein the HARQ process to which the uplink grant corresponds is determined based at least on a search space in which the PDCCH is decoded.

(18) In the third aspect of the present embodiment, in a case that the PDCCH is decoded in a common search space, the uplink grant corresponds to a HARQ process with a predetermined number.

(19) A fourth aspect of the present embodiment is a base station apparatus including a transmitter 30 configured to transmit a PDCCH including an uplink grant, and a medium access control layer processing unit 35 configured to manage multiple HARQ processes, wherein the HARQ process to which the uplink grant corresponds is determined based on at least a search space in which the PDCCH is transmitted.

(20) In a fifth aspect of the present embodiment, in a case that the PDCCH is transmitted in a common search space, the uplink grant corresponds to a HARQ process with a predetermined number.

(21) A sixth aspect of the present embodiment is a terminal apparatus including a transmitter 10 configured to perform an initial transmission of a transport block; and a receiver 10 configured to attempt to decode a PDCCH for retransmission of the transport block, wherein a type of a search space in which decoding of the PDCCH for the retransmission of the transport block is attempted may be determined, based at least on (1) a type of a random access procedure to which a random access response grant including an uplink grant for the initial transmission for the transport block corresponds, (2) a type of a search space to which the PDCCH including the uplink grant for the initial transmission of the transport block is mapped, (3) which of the random access response and the PDCCH the uplink grant for the initial transmission of the transport block is included in, and/or (4) whether an RRC layer parameter shortProcessingTime is configured.

(22) A seventh aspect of the present embodiment is a base station apparatus including a receiver 30 configured to receive an initial transmission of a transport block, and a transmitter 30 configured to transmit a PDCCH for retransmission of the transport block, wherein a type of a search space in which the PDCCH for retransmission of the transport block is transmitted may be determined, based at least on (1) a type of a random access procedure to which a random access response grant including an uplink grant for the initial transmission for the transport block corresponds, (2) a type of a search space to which the PDCCH including the uplink grant for the initial transmission of the transport block is mapped, (3) which of the random access response and the PDCCH the uplink grant for the initial transmission of the transport block is included in, and/or (4) whether an RRC layer parameter shortProcessingTime is configured.

(23) In the sixth aspect of the present embodiment, in a case that the RRC layer parameter shortProcessingTime is configured for the terminal apparatus and that the uplink grant for the initial transmission of the transport block is included in the random access response corresponding to a non-contention based random access procedure, the type of the search space in which decoding of the PDCCH for the retransmission of the transport block is attempted may be determined to be a common search space. In this regard, the receiver 10 does not attempt to decode the PDCCH for the retransmission of the transport block in the UE-specific search space.

(24) In the sixth aspect of the present embodiment, in a case that the RRC layer parameter shortProcessingTime is not configured for the terminal apparatus and that the uplink grant for the initial transmission of the transport block is included in the random access response corresponding to a non-contention based random access procedure, the type of the search space in which decoding of the PDCCH for the retransmission of the transport block is attempted may be determined to be a common search space and a UE-specific search space. In this regard, the receiver 10 attempts to decode the PDCCH for the retransmission of the transport block in the common search space and the UE-specific search space.

(25) In the sixth aspect of the present embodiment, in a case that the uplink grant for the initial transmission of the transport block is included in the random access response corresponding to a contention based random access procedure, the type of the search space in which decoding of the PDCCH for the retransmission of the transport block is attempted may be determined to be a common search space regardless of whether or not the RRC layer parameter shortProcessingTime is configured for the terminal apparatus. In this regard, the receiver 10 does not attempt to decode the PDCCH for the retransmission of the transport block in the UE-specific search space.

(26) In the sixth aspect of the present embodiment, in a case that the RRC layer parameter shortProcessingTime is configured for the terminal apparatus and that the uplink grant for the initial transmission of the transport block is included in PDCCH, the type of the search space in which decoding of the PDCCH for the retransmission of the transport block is attempted may be determined based on the type of the search space to which the PDCCH including the uplink grant for the initial transmission of the transport block is mapped. In this regard, in a case that the PDCCH including the uplink grant for the initial transmission of the transport block is mapped in the common search space, the receiver 10 may attempt to decode the PDCCH for the retransmission of the transport block in the common search space. In other words, in a case that the PDCCH including the uplink grant for the initial transmission of the transport block is mapped in the common search space, the receiver 10 does not attempt to decode the PDCCH for the retransmission of the transport block in the UE-specific search space. In a case that the PDCCH including the uplink grant for the initial transmission of the transport block is mapped in the UE-specific search space, the receiver 10 may attempt to decode the PDCCH for the retransmission of the transport block in the UE-specific search space. In other words, in a case that the PDCCH including the uplink grant for the initial transmission of the transport block is mapped in the UE-specific search space, the receiver 10 does not attempt to decode the PDCCH for the retransmission of the transport block in the common search space.

(27) In the sixth aspect of the present embodiment, in a case that the RRC layer parameter shortProcessingTime is not configured for the terminal apparatus and that the uplink grant for the initial transmission of the transport block is included in the PDCCH, the type of the search space in which decoding of the PDCCH for the retransmission of the transport block is attempted may be determined to be a common search space and a UE-specific search space, not based on the type of search space to which the PDCCH including the uplink grant for the initial transmission of the transport block is mapped. In this regard, the receiver 10 may attempt to decode PDCCH for the retransmission of the transport block in the common search space and the UE-specific search space.

(28) In the seventh aspect of the present embodiment, in a case that the RRC layer parameter shortProcessingTime is configured for the terminal apparatus and that the uplink grant for the initial transmission of the transport block is included in the random access response corresponding to a non-contention based random access procedure, the type of the search space in which the PDCCH for the retransmission of the transport block is transmitted may be determined to be a common search space. In this regard, the transmitter 30 does not transmit the PDCCH for the retransmission of the transport block in the UE-specific search space.

(29) In the seventh aspect of the present embodiment, in a case that the RRC layer parameter shortProcessingTime is not configured for the terminal apparatus and that the uplink grant for the initial transmission of the transport block is included in the random access response corresponding to a non-contention based random access procedure, the type of the search space in which the PDCCH for the retransmission of the transport block is transmitted may be determined to be a common search space and a UE-specific search space. In this regard, the transmitter 30 transmits the PDCCH for the retransmission of the transport block in the common search space and the UE-specific search space.

(30) In the seventh aspect of the present embodiment, in a case that the uplink grant for the initial transmission of the transport block is included in the random access response corresponding to a contention based random access procedure, the type of the search space in which the PDCCH for the retransmission of the transport block is transmitted may be determined to be a common search space regardless of whether or not the RRC layer parameter shortProcessingTime is configured for the terminal apparatus. In this regard, the transmitter 30 does not transmit the PDCCH for the retransmission of the transport block in the UE-specific search space.

(31) In the seventh aspect of the present embodiment, in a case that the RRC layer parameter shortProcessingTime is configured for the terminal apparatus and that the uplink grant for the initial transmission of the transport block is included in the PDCCH, the type of the search space in which the PDCCH for the retransmission of the transport block is transmitted may be determined based on the type of the search space to which the PDCCH including the uplink grant for the initial transmission of the transport block is mapped. In this regard, in a case that the PDCCH including the uplink grant for the initial transmission of the transport block is mapped in the common search space, the transmitter 30 transmits the PDCCH for the retransmission of the transport block in the common search space. In other words, in a case that the PDCCH including the uplink grant for the initial transmission of the transport block is mapped in the common search space, the transmitter 30 does not transmit the PDCCH for the retransmission of the transport block in the UE-specific search space. In a case that the PDCCH including the uplink grant for the initial transmission of the transport block is mapped in the UE-specific search space, the transmitter 30 transmits the PDCCH for the retransmission of the transport block in the UE-specific search space. In other words, in a case that the PDCCH including the uplink grant for the initial transmission of the transport block is mapped in the UE-specific search space, the transmitter 30 does not transmit the PDCCH for the retransmission of the transport block in the common search space.

(32) In the seventh aspect of the present embodiment, in a case that the RRC layer parameter shortProcessingTime is not configured for the terminal apparatus and that the uplink grant for the initial transmission of the transport block is included in the PDCCH, the type of the search space in which the PDCCH for the retransmission of the transport block is transmitted may be determined to be a common search space and a UE-specific search space, not based on the type of search space to which the PDCCH including the uplink grant for the initial transmission of the transport block is mapped. In this regard, the transmitter 30 transmits the PDCCH for the retransmission of the transport block in the common search space and the UE-specific search space.

(33) In the sixth and seventh aspects of the present embodiment, the search space includes a common search space and a UE-specific search space, and types of the random access procedure include a contention based random access procedure and a non-contention based random access procedure.

(34) In the sixth and seventh aspects of the present embodiment, the PDCCH includes the uplink grant for the initial transmission of the transport block and/or the uplink grant for the retransmission of the transport block.

With this configuration, the terminal apparatus 1 is capable of efficiently communicating with the base station apparatus 3.

Each of a program running on a base station apparatus 3 and a terminal apparatus 1 according to the present invention may be a program that controls a Central Processing Unit (CPU) and the like, such that the program causes a computer to operate in such a manner as to realize the functions of the above-described embodiment according to the present invention. The information handled in these devices is temporarily stored in a Random Access Memory (RAM) while being processed. Thereafter, the information is stored in various types of Read Only Memory (ROM) such as a Flash ROM and a Hard Disk Drive (HDD), and when necessary, is read by the CPU to be modified or rewritten.

Note that the terminal apparatus 1 and the base station apparatus 3 according to the above-described embodiment may be partially achieved by a computer. In that case, this configuration may be realized by recording a program for realizing such control functions on a computer-readable recording medium and causing a computer system to read the program recorded on the recording medium for execution.

Note that it is assumed that the "computer system" mentioned here refers to a computer system built into the terminal apparatus 1 or the base station apparatus 3, and the computer system includes an OS and hardware components such as a peripheral apparatus. Furthermore, the "computer-readable recording medium" refers to a portable medium such as a flexible disk, a magneto-optical disk, a ROM, a CD-ROM, and the like, and a storage apparatus such as a hard disk built into the computer system.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the program may be configured to realize some of the functions described above, and also may be configured to be capable of realizing the functions described above in combination with a program already recorded in the computer system.

Furthermore, the base station apparatus 3 according to the above-described embodiment may be achieved as an aggregation (apparatus group) including multiple apparatuses. Each of the apparatuses configuring such an apparatus group may include some or all portions of each function or each functional block of the base station apparatus 3 according to the above-described embodiment. The apparatus group may include each general function or each functional block of the base station apparatus 3. Furthermore, the terminal apparatus 1 according to the above-described embodiment can also communicate with the base station apparatus as the aggregation.

Furthermore, the base station apparatus 3 according to the above-described embodiment may serve as an Evolved Universal Terrestrial Radio Access Network (EUTRAN). Furthermore, the base station apparatus 3 according to the above-described embodiment may have some or all portions of the functions of a node higher than an eNodeB.

Furthermore, some or all portions of each of the terminal apparatus 1 and the base station apparatus 3 according to the above-described embodiment may be typically achieved as an LSI which is an integrated circuit or may be achieved as a chip set. The functional blocks of each of the terminal apparatus 1 and the base station apparatus 3 may be individually achieved as a chip, or some or all of the functional blocks may be integrated into a chip. Furthermore, a circuit integration technique is not limited to the LSI, and may be realized with a dedicated circuit or a general-purpose processor. Furthermore, in a case where with advances in semiconductor technology, a circuit integration technology with which an LSI is replaced appears, it is also possible to use an integrated circuit based on the technology.

Furthermore, according to the above-described embodiment, the terminal apparatus has been described as an example of a communication apparatus, but the present invention is not limited to such a terminal apparatus, and is applicable to a terminal apparatus or a communication apparatus of a fixed-type or a stationary-type electronic apparatus installed indoors or outdoors, for example, such as an Audio-Video (AV) apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Various modifications are possible within the scope of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

CROSS-REFERENCE OF RELATED APPLICATION

This application relates to the application of Application No. 2017-104369, filed May 26, 2017, and claims priority based on the above application. The contents of the above application are incorporated herein by reference.

REFERENCE SIGNS LIST

1 (1A, 1B, 1C) Terminal apparatus
3 Base station apparatus
10 Radio transmission and/or reception unit (transmitter, receiver, or physical layer processing unit)
11 Antenna unit
12 RF unit
13 Baseband unit
14 Higher layer processing unit
15 Medium access control layer processing unit
16 Radio resource control layer processing unit
30 Radio transmission and/or reception unit (transmitter, receiver, or physical layer processing unit)
31 Antenna unit
32 RF unit
33 Baseband unit
34 Higher layer processing unit
35 Medium access control layer processing unit
36 Radio resource control layer processing unit

The invention claimed is:

1. A terminal apparatus comprising:
a transmitter configured to perform an initial transmission of a transport block; and
a receiver configured to attempt to decode a PDCCH for retransmission of the transport block, wherein
an uplink grant for the initial transmission of the transport block is included in a random access response corresponding to a non-contention based random access procedure, and
a type of a search space in which decoding of the PDCCH for retransmission of the transport block is attempted is determined, based at least on whether an RRC layer parameter shortProcessingTime is configured, wherein
in a case that the RRC layer parameter shortProcessingTime is configured, the type of the search space in which decoding of the PDCCH for retransmission of the transport block is attempted is a common search space, and
in a case that the RRC layer parameter shortProcessingTime is not configured, the type of the search space in which decoding of the PDCCH for retransmission of the transport block is attempted is the common search space and a UE-specific search space.

2. A base station apparatus for communicating with a terminal apparatus, the base station apparatus comprising:
a receiver configured to receive an initial transmission of a transport block; and
a transmitter configured to transmit a PDCCH for retransmission of the transport block, wherein
an uplink grant for the initial transmission of the transport block is included in a random access response corresponding to a non-contention based random access procedure, and
a type of a search space in which the PDCCH for retransmission of the transport block is transmitted is determined, based at least on whether an RRC layer parameter shortProcessingTime is configured for the terminal apparatus, wherein
in a case that the RRC layer parameter shortProcessingTime is configured for the terminal apparatus, the type of the search space in which the PDCCH for retransmission of the transport block is transmitted is a common search space, and
in a case that the RRC layer parameter shortProcessingTime is not configured for the terminal apparatus, the type of the search space in which decoding of the PDCCH for retransmission of the transport block is attempted is the common search space and a UE-specific search space.

3. A communication method used for a terminal apparatus, the communication method comprising the steps of:
performing an initial transmission of a transport block; and
attempting to decode a PDCCH for retransmission of the transport block, wherein
an uplink grant for the initial transmission of the transport block is included in a random access response corresponding to a non-contention based random access procedure,
a type of a search space in which decoding of the PDCCH for retransmission of the transport block is attempted is determined, based at least on whether or not an RRC layer parameter shortProcessingTime is configured,
in a case that the RRC layer parameter shortProcessingTime is configured, the type of the search space in which decoding of the PDCCH for retransmission of the transport block is attempted is a common search space, and in a case that the RRC layer parameter shortProcessingTime is not configured, the type of the search space in which decoding of the PDCCH for retransmission of the transport block is attempted is the common search space and a UE-specific search space.

4. A communication method used for a base station apparatus configured to communicate with a terminal apparatus, the communication method comprising the steps of:

receiving an initial transmission of a transport block, and transmitting a PDCCH for retransmission of the transport block, wherein an uplink grant for the initial transmission of the transport block is included in a random access response corresponding to a non-contention based random access procedure, a type of a search space in which the PDCCH for retransmission of the transport block is transmitted is determined, based at least on whether an RRC layer parameter shortProcessingTime is configured for the terminal apparatus, in a case that the RRC layer parameter shortProcessingTime is configured for the terminal apparatus, the type of the search space in which the PDCCH for retransmission of the transport block is transmitted is a common search space, and in a case that the RRC layer parameter shortProcessingTime is not configured for the terminal apparatus, the type of the search space in which decoding of the PDCCH for retransmission of the transport block is attempted is the common search space and a UE-specific search space.

* * * * *